US012017535B2

(12) United States Patent
Nishimura et al.

(10) Patent No.: US 12,017,535 B2
(45) Date of Patent: Jun. 25, 2024

(54) DISPLAY CONTROLLER, WORKING MACHINE, AND COMPUTER READABLE STORAGE MEDIUM

(71) Applicant: KUBOTA CORPORATION, Osaka (JP)

(72) Inventors: Tsuyoshi Nishimura, Sakai (JP); Dai Kadota, Sakai (JP); Ryo Hashimoto, Sakai (JP); Yuki Iyonaga, Sakai (JP); Takuma Sai, Sakai (JP); Atsushi Matsumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 361 days.

(21) Appl. No.: 17/327,378

(22) Filed: May 21, 2021

(65) Prior Publication Data

US 2021/0331590 A1  Oct. 28, 2021

Related U.S. Application Data

(63) Continuation of application No. PCT/JP2019/051532, filed on Dec. 27, 2019.

(30) Foreign Application Priority Data

Dec. 28, 2018 (JP) .................. 2018-248042
Dec. 28, 2018 (JP) .................. 2018-248043

(Continued)

(51) Int. Cl.
*B60Q 1/00* (2006.01)
*B60K 35/60* (2024.01)
(Continued)

(52) U.S. Cl.
CPC .............. *B60K 35/60* (2024.01); *B60K 35/10* (2024.01); *B60K 35/215* (2024.01); *B60K 35/28* (2024.01);
(Continued)

(58) Field of Classification Search
CPC .............. B60K 37/02; B60K 2370/119; B60K 2370/154; B60K 2370/178;
(Continued)

(56) References Cited

U.S. PATENT DOCUMENTS 5,666,793 A * 9/1997 Bottinger ............. A01B 79/005
56/DIG. 15
5,978,720 A * 11/1999 Hieronymus .......... A01B 63/00
340/684

(Continued)

FOREIGN PATENT DOCUMENTS

DE  102013110610 A1 *  3/2015 ........... A01D 41/127
JP  2005-126017 A     5/2005

(Continued)

OTHER PUBLICATIONS

Japanese Office Action for Japanese Application No. 2022-186582, dated Sep. 5, 2023, with English translation.

*Primary Examiner* — Tai T Nguyen
(74) *Attorney, Agent, or Firm* — Birch, Stewart, Kolasch & Birch, LLP

(57) ABSTRACT

A display controller for controlling a content displayed on the display provided on the working machine comprises a display control unit. The display control unit is configured to display, on the display, an icon image indicating information regarding the working machine and a plurality of graphic meter images indicating respective conditions of the work- (Continued)

ing machine so that the graphic meter images, each in an arcuate shape, are displayed as being arranged so as to surround the icon image.

19 Claims, 18 Drawing Sheets

(30) Foreign Application Priority Data

| Dec. 28, 2018 | (JP) | 2018-248044 |
|---|---|---|
| Dec. 28, 2018 | (JP) | 2018-248045 |
| Dec. 28, 2018 | (JP) | 2018-248046 |
| Dec. 28, 2018 | (JP) | 2018-248047 |

(51) Int. Cl.
  *B60K 35/10* (2024.01)
  *B60K 35/215* (2024.01)
  *B60K 35/28* (2024.01)
  *B60K 35/81* (2024.01)

(52) U.S. Cl.
  CPC ......... *B60K 35/81* (2024.01); *B60K 2360/119* (2024.01); *B60K 2360/178* (2024.01)

(58) Field of Classification Search
  CPC ........ B60K 2370/52; B60K 2370/1523; B60K 2370/161; B60K 2370/171; B60K 2370/176; B60K 2370/61; B60K 35/00; E02F 3/964; E02F 9/2091; E02F 9/267
  USPC .......................................................... 340/461
  See application file for complete search history.

(56) References Cited

U.S. PATENT DOCUMENTS

| 2003/0066277 | A1* | 4/2003 | Behnke | A01D 41/127 |
| | | | | 56/10.2 R |
| 2006/0069485 | A1* | 3/2006 | Diekhans | A01F 15/08 |
| | | | | 701/50 |
| 2008/0288144 | A1* | 11/2008 | Jeppe | A01D 43/08 |
| | | | | 701/50 |
| 2009/0243831 | A1 | 10/2009 | Miura et al. | |
| 2014/0058635 | A1* | 2/2014 | Furukawa | E02F 9/267 |
| | | | | 701/50 |
| 2016/0091002 | A1 | 3/2016 | Miura et al. | |
| 2016/0125666 | A1 | 5/2016 | Izumikawa et al. | |
| 2017/0021769 | A1 | 1/2017 | Izumikawa et al. | |
| 2018/0282976 | A1 | 10/2018 | Hasegawa | |
| 2019/0187869 | A1* | 6/2019 | Spitz | G06F 3/04817 |
| 2019/0309500 | A1 | 10/2019 | Horii | |

FOREIGN PATENT DOCUMENTS

| JP | 2006-214757 A | | 8/2006 | |
| JP | 2007-83990 A | | 4/2007 | |
| JP | 2008-137558 A | | 6/2008 | |
| JP | 2009-235720 A | | 10/2009 | |
| JP | 2010-8891 A | | 1/2010 | |
| JP | 2011-231488 A | | 11/2011 | |
| JP | 2013-49294 A | | 3/2013 | |
| JP | 2013-129352 A | | 7/2013 | |
| JP | 2016-70004 A | | 5/2016 | |
| JP | 2016-78706 A | | 5/2016 | |
| JP | 2016-84014 A | | 5/2016 | |
| JP | 2016-97928 A | | 5/2016 | |
| JP | 2016-130104 A | | 7/2016 | |
| JP | 2017-153162 A | | 8/2017 | |
| JP | 2018-34581 A | | 3/2018 | |
| JP | 2018-104931 A | | 7/2018 | |
| JP | 2019004802 A | * | 1/2019 | |
| WO | WO-03057523 A1 | * | 7/2003 | ............ B60K 35/00 |
| WO | WO 2015/008655 A1 | | 1/2015 | |
| WO | WO 2015/163382 A1 | | 10/2015 | |
| WO | WO 2016/067986 A1 | | 5/2016 | |

* cited by examiner

Fig.11
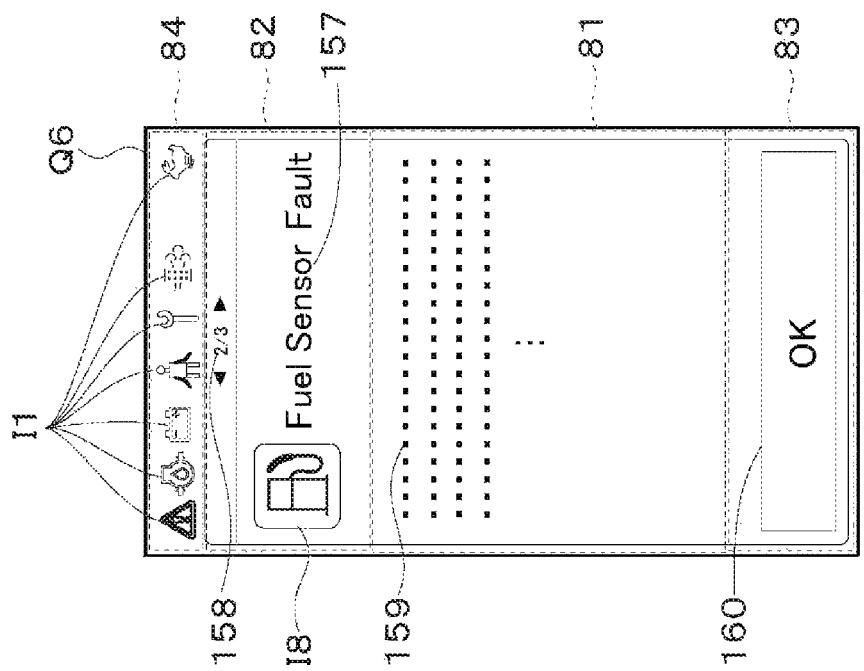
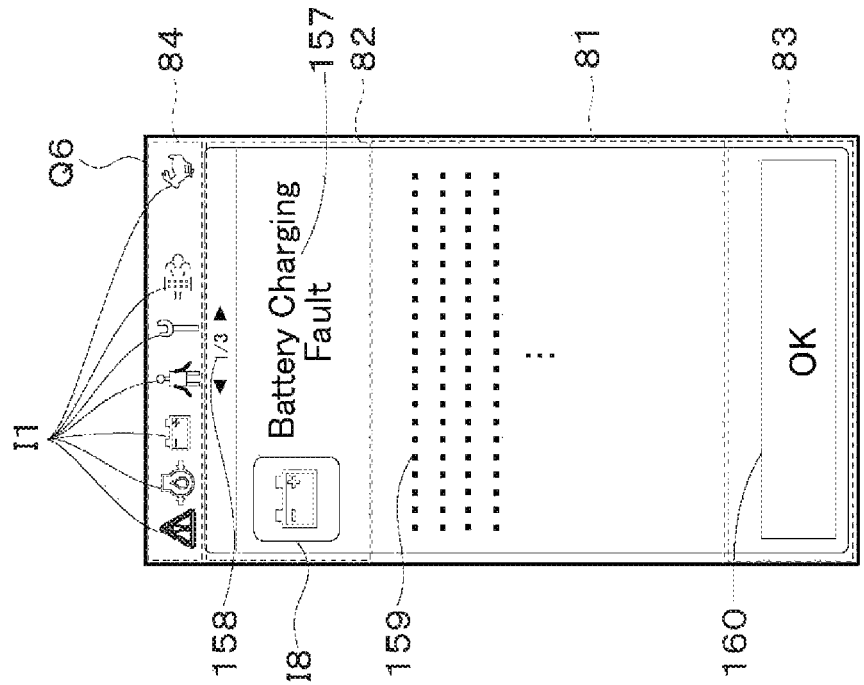

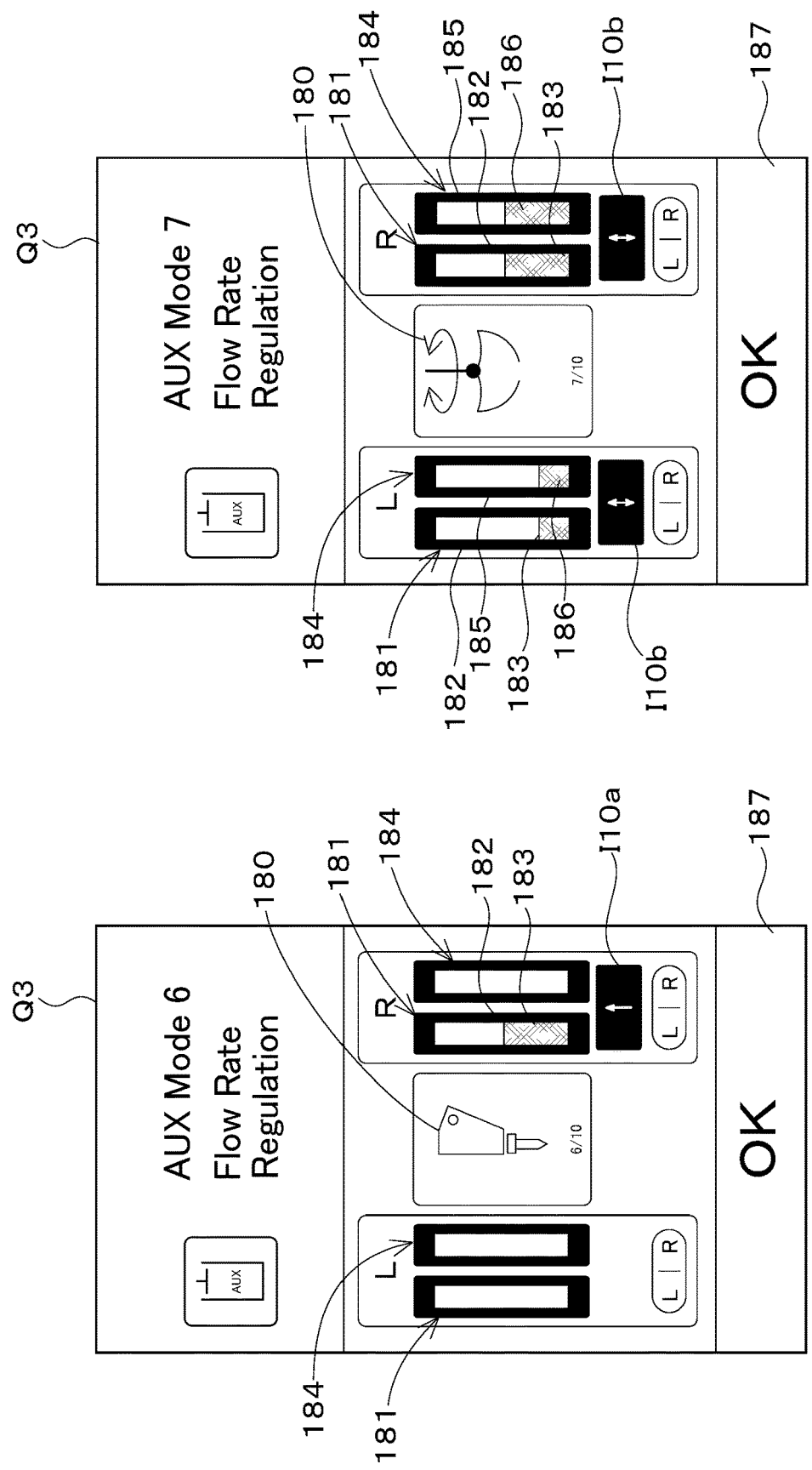

Fig.16

| Attachment | Icon | 1st Control Valve | | 2nd Control Valve | | Three Way Valve Third Line |
|---|---|---|---|---|---|---|
| | | Left Operation | Right Operation | Left Operation | Right Operation | |
| Bucket (or No Attachment) |  | Inactive | Inactive | Inactive | Inactive | — |
| Tilt Bucket |  | Inactive | Inactive | 25% | 25% | 2way |
| Breaker |  | Inactive | Inactive | 100% | Inactive | 1way |
| Clamshell | 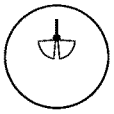 | Inactive | Inactive | 100% | 100% | 2way |
| Auger |  | Inactive | Inactive | 100% | 100% | 2way |
| Grapple |  | Inactive | Inactive | 50% | 50% | 2way |
| Rotary Grapple |  | 25% | 25% | 50% | 50% | 2way |
| Brushcutter |  | Inactive | Inactive | 100% | Inactive | 1way |
| Thumb |  | Inactive | Inactive | 50% | 50% | 2way |
| AUX(Standard) | 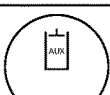 | 100% | 100% | 100% | 100% | 2way |

DISPLAY CONTROLLER, WORKING MACHINE, AND COMPUTER READABLE STORAGE MEDIUM

CROSS REFERENCE TO RELATED APPLICATIONS

This application is a continuation application of international application No. PCT/JP2019/051532, filed on Dec. 27, 2019, which claims the benefit of priority to Japanese Patent Application No. 2018/248043, filed on Dec. 28, 2018, to Japanese Patent Application No. 2018/248042, filed on Dec. 28, 2018, to Japanese Patent Application No. 2018/248044, filed on Dec. 28, 2018, to Japanese Patent Application No. 2018/248045, filed on Dec. 28, 2018, to Japanese Patent Application No. 2018/248046, filed on Dec. 28, 2018, and to Japanese Patent Application No. 2018/248047, filed on Dec. 28, 2018. The entire contents of each of these applications are hereby incorporated herein by reference.

BACKGROUND OF THE INVENTION

Field of the Invention

The present invention relates to a display controller for controlling the displaying performance of a display equipped on a working machine. Also, the present invention relates to a working machine equipped with the display controller, relates to a program for operating the display controller, and relates to a storage medium storing the program.

Description of the Related Art

There is a well-known conventional working machine equipped with a display for displaying graphic meter images, as disclosed in Japanese Unexamined Patent Publication No. 2009-235720. Also, there is a well-known conventional working machine equipped with a display for switchably displaying either an operation screen on which information regarding operations for work is indicated or a photographed image screen on which a photographed image having been photographed by a photographing device is displayed, as disclosed in Japanese Unexamined Patent Publication No. 2018-104931.

SUMMARY OF THE INVENTION

In an aspect of the present invention, a display controller for controlling a content displayed on a display provided on a working machine comprises a display control unit is configured to display, on the display, an icon image indicating information regarding the working machine and a plurality of graphic meter images indicating conditions of the working machine. The display control unit is configured to display the graphic meter images, each in an arcuate shape, arranged so as to surround the icon image.

The display control unit is configured to display the graphic meter images arranged to collectively form an outline of a common circle so that each of the graphic meter images defines a part of the circle.

The display control unit is configured to display the graphic meter images including a first graphic meter image arranged below the icon image, a second graphic meter image arranged rightward from the icon image, and a third graphic meter image arranged leftward from the icon image.

The icon image indicates an attachment attached to the working machine.

The display control unit is configured to display the graphic meter images including some or all of graphic meter images indicating a residual quantity of fuel for driving an engine equipped on the working machine, a temperature of engine oil or engine cooling water for the engine, and a temperature of hydraulic fluid for driving an attachment attached to the working machine.

The display control unit is configured to display meter icon images adjacent to the graphic meter images, each of the meter icon images corresponding to information indicated by each of the graphic meter images.

The display control unit is configured to display, in a first display region on the display, selectively either the plurality of arcuate graphic meter images in a first display state or a photographed image of surroundings of the working machine. The display controller is configured to display, in the first display state, the icon image is displayed at a central portion of the first display region and the graphic meter images are displayed in the first display region around the icon image. The display control unit is configured so that, in the second display state, the icon image is displayed in a second display region smaller than the first display region on the display, and bar images indicating the same information as the graphic meter images are displayed in the second display region on both sides of the icon image.

A display controller for controlling a content displayed on a display provided on a working machine comprises a display control unit configured to display, in a first display region of the display, selectively either a plurality of arcuate graphic meter images indicating conditions of the working machine in a first display state or a photographed image of surroundings of the working machine in a second display state. The display control unit is configured so that, in the first display state, the icon image is displayed at a central portion of the first display region, and the graphic meter images are displayed in the first display region around the icon image. The display control unit is configured so that, in the second display state, the icon image is displayed in a second display region of the display smaller than the first display region, and bar images indicating the same information as the graphic meter images are displayed in the second display region on both sides of the icon image.

When a predetermined menu displaying operation is performed, the display control unit is configured to display that a menu image indicating a plurality of optional items in a partial section of a display screen of the display.

The display control unit is configured so that either the graphic meter images or the photographed image of surroundings of the working machine are/is displayed in a first display region of a display screen. The display control unit is configured so that, when a predetermined warning condition of the working machine occurs, the display control unit is configured so that warning information corresponding to the occurring warning condition is indicated in a second display region smaller than the first display region. The display control unit is configured so that, when a plurality of warning conditions occur, warning information corresponding to one of the warning conditions is displayed in the second display region and the number of the pieces of warning information corresponding to the occurring warning conditions is indicated on the display screen.

The display controller is configured to indicate, on the display, maximum flow rate levels of hydraulic fluid supplied or discharged to and from an actuator for driving an attachment. The display controller comprises a storage unit storing plural kinds of attachments capable of being attached to the working machine and settings of the maximum flow rate levels corresponding to the respective kinds of attachments. The display control unit is configured to command the display to display a list of the settings of maximum flow rate levels corresponding to the respective kinds of attachments.

The display controller is configured to display, on the display, flow rate setting images for variable setting of maximum flow rate levels of hydraulic fluid supplied and discharged to and from an actuator for driving an attachment attached to the working machine including operation members each operable in operation directions for controlling the hydraulic fluid flow to and from the actuator. The display controller includes a storage unit which stores plural kinds of attachments capable of being attached to the working machine, at least one of the operation members required to operate each of the stored kinds of attachments, and at least one of the operation directions for operation of the required at least one operation member to operate each of the stored kinds of attachments. The display control unit is configured to display, when an operation to set the maximum flow rate levels of hydraulic fluid corresponding to one attachment selected from the stored kinds of attachments is performed, flow rate setting images which correspond to the respective operation members and correspond to the respective operation directions of each of the operation members. Any of the flow rate setting images, which corresponds to the at least one operation member required to operate the selected kind of attachment and corresponds to the at least one operation direction of the required at least one operation member required to operate the selected attachment, is displayed as being in an active state indicating that the variable setting of the corresponding maximum flow rate level is acceptable. Any of the flow rate setting images, which corresponds to the at least one operation member unrequired to operate the selected kind of attachment or corresponds to the at least one operation direction unrequired to operate the selected attachment, is displayed as being in an inactive state indicating that the variable setting of the corresponding maximum flow rate level is inacceptable, or is not displayed.

A working machine comprises the display controller and a display displaying a content that is controlled by the display controller.

A computer readable storage medium stores a program to be executed by a computer for a processing by means of a display control unit in the display controller.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 11 illustrates an example of the display screen indicating second detailed information.

FIG. 15 illustrates an example of the display screen displaying a flow rate setting screen.

FIG. 16 illustrates a table indicating a relation of exemplary settings of flow rates and exemplary settings of switching valves indicated on the flow rate screen to the respective kinds of optional attachments.

DETAILED DESCRIPTION OF THE PREFERRED EMBODIMENTS

Figure 1:
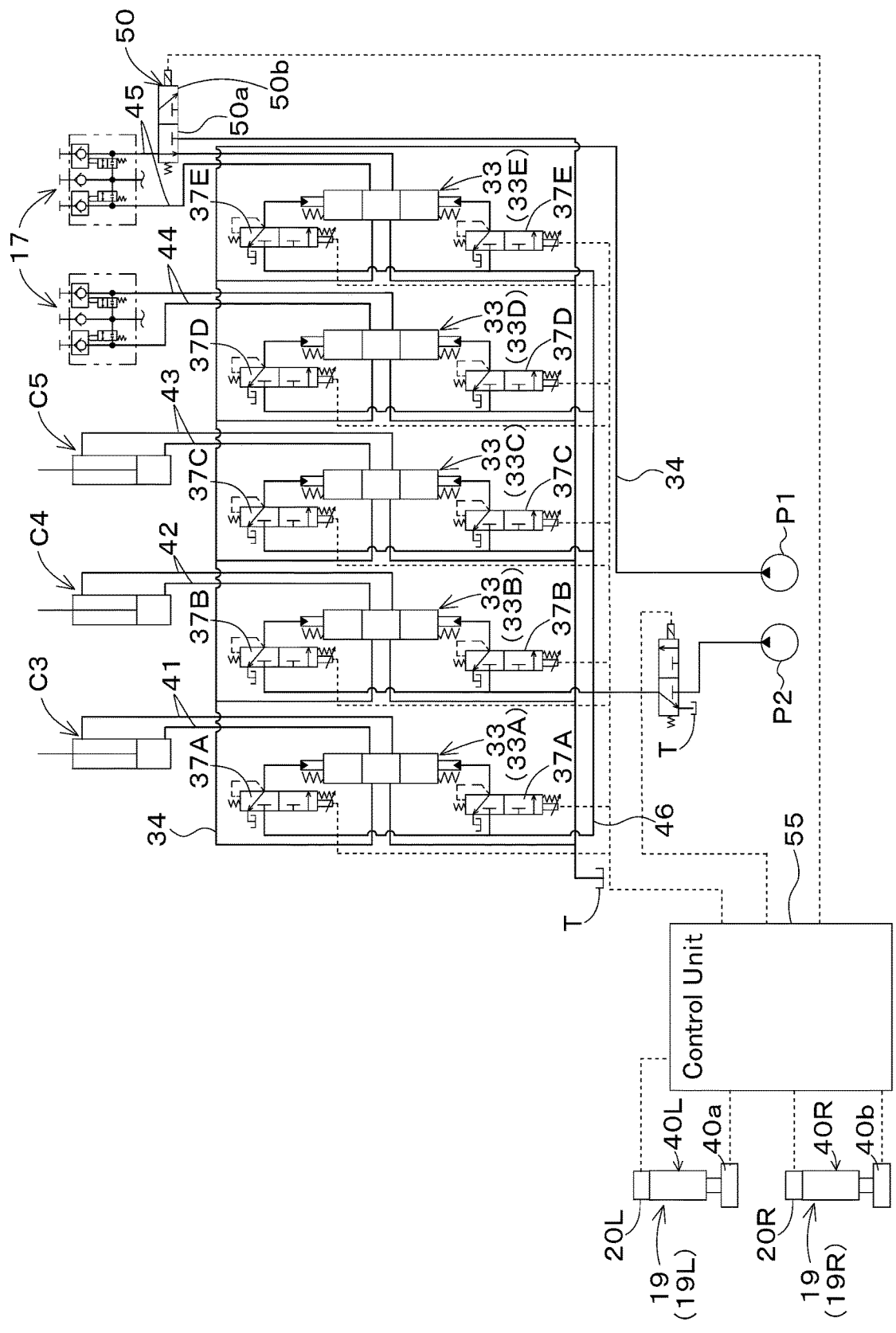
FIG. 1 is a schematic diagram of a hydraulic system or circuit for a working machine.

Preferred embodiments will now be described with reference to the accompanying drawings, wherein like reference numerals designate corresponding or identical elements throughout the various drawings. The drawings are to be viewed in an orientation in which the reference numerals are viewed correctly.

An embodiment of the present invention will be described with reference to the accompanying drawings.

Figure 17:
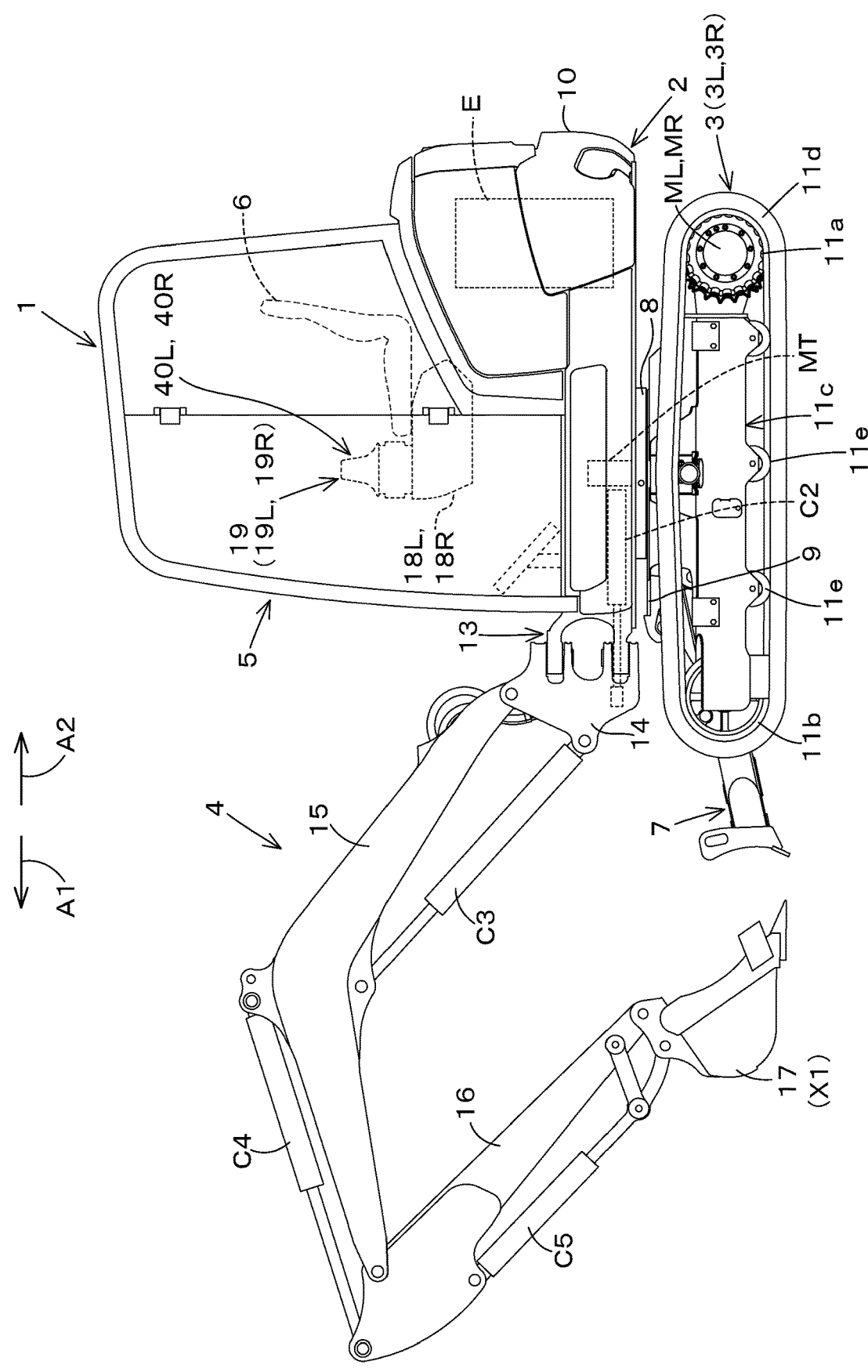
FIG. 17 is a schematic side view of the working machine.

FIG. 17 is a schematic side view of an entire working machine 1 according to the present embodiment. A backhoe serves as an example of the working machine 1 according to the present embodiment.

A general configuration of the working machine 1 will be described.

Referring to FIG. 17, the working machine 1 includes a machine body (or a swivel base) 2, a traveling device 3 and a working device 4. A cabin 5 is mounted on the machine body 2. An operator seat 6 is provided inside the cabin 5.

The following description of the embodiment is based on that a forward direction corresponds to the forward direction from an operator sitting on the operator seat 6 of the working machine 1 as oriented by an arrow A1 in FIG. 17, a rearward direction corresponds to the rearward direction from the operator as oriented by an arrow A2 in FIG. 17, a leftward direction corresponds to the leftward direction from the operator as oriented toward the back side of FIG. 17, and a rightward direction corresponds to the rightward direction from the operator as oriented toward the front side of FIG.

17. Also, the description is based on that a lateral direction corresponds to a horizontal direction perpendicular to the forward-rearward direction of the machine body 2, a machine outward direction corresponds to the rightward or leftward direction from a central portion in the lateral direction of the machine body 2, and a machine inward direction corresponds to the direction opposite to the machine outward direction.

Referring to FIG. 17, the traveling device 3 is provided with a left track unit 3L and a right track unit 3R. Each of the track units 3L and 3R is a crawler track including a drive wheel 11a, a follower wheel 11b, a frame 11c, a belt 11d and rollers 11e. The frame 11c rotatably supports the wheels 11a and 11b and rollers 11e, and the belt 11d is looped over the wheels 11a and 11b and rollers 11e. The track units 3L and 3R are provided with first and second traveling motors ML and MR, respectively. Each of the first and second traveling motors ML and MR is supported by the corresponding frame 11c so as to generate a driving force transmitted to the corresponding drive wheel 11a.

Referring to FIG. 17, a dozer device 7 is attached to a front portion of the traveling device 3. The dozer device 7 is provided with an unillustrated dozer cylinder which is telescopically movable for vertical movement thereof, i.e., for raising and lowering a blade thereof.

Referring to FIG. 17, the machine body 2 is supported by the traveling device 3 via a swivel bearing 8 rotatably around a vertical axis defined by the swivel bearing 8. The machine body 2 is rotationally turned by a hydraulic actuator, e.g., a hydraulic motor, referred to as a turning motor MT. The machine body 2 includes a rotatable platform 9 and a counterweight 10. The platform 9 is made of a steel plate or so on and is coupled to the swivel bearing 8, thereby being rotatably centered on the vertical axis. The counterweight 10 is disposed at a rear portion of the machine body 2. An engine E serving as a prime mover is mounted on a rear portion of the machine body 2. The engine E is a diesel engine. Alternatively, an electric motor may serve as the prime mover. Alternatively, the prime mover may be a hybrid system including a diesel engine and an electric motor.

The machine body 2 includes a support bracket 13 disposed slightly rightward from the center portion thereof in the lateral direction. The swing bracket 14 is pivotally coupled at a basal end portion thereof to the support bracket 13 rotatably around a vertical axis. The working device 4 is mounted onto the swing bracket 14.

Referring to FIG. 17, the working device 4 includes a boom 15, an arm 16 and an attachment 17. The boom 15 is pivotally coupled at a basal end portion thereof to the swing bracket 14 rotatably around a lateral axis, thereby being vertically swingable. The arm 16 is pivotally coupled to a tip portion of the boom 15 rotatably around a lateral axis, thereby being fore-and-aft or vertically swingable. The attachment 17 is attached to a tip portion of the arm 16. FIG. 17 illustrates a bucket X1 (see FIG. 16) serving as an example of the attachment 17 optionally attached to the tip portion of the arm 16. An alternative or additional hydraulically driven attachment may be optionally attached to the working machine 1. In this regard, referring to FIG. 16, a tilt bucket X2, a breaker X3, a clamshell X4, an auger X5, a grapple X6, a rotary grapple X7, a brushcutter X8, a thumb X9 or so on may serve as an example of the alternative or additional attachment.

The swing bracket 14 is swingable based on the telescopic movement of a swing cylinder C2 disposed inside the machine body 2. The boom 15 is swingable based on the telescopic movement of a boom cylinder C3. The arm 16 is swingable based on the telescopic movement of an arm cylinder C4. The attachment 17 is swingable based on the telescopic movement of an attachment cylinder C5. The dozer cylinder, swing cylinder C2, boom cylinder C3, arm cylinder C4 and attachment cylinder C5 are hydraulic cylinders serving as hydraulic actuators.

Referring to FIG. 17, operation consoles 18L and 18R are disposed inside the cabin 5 on laterally opposite sides of the operator seat 6. The operation consoles 18L and 18R are provided with operation devices 19, including an operation device 19L provided on the operation console 18L and an operation device 19R provided on the operation console 18R.

FIG. 1 generally illustrates hydraulic circuits serving as a hydraulic system for operating the hydraulic actuators of the working machine 1, including working actuators and traveling actuators. The boom cylinder C3, arm cylinder C4, attachment cylinder C5, attachment 17, turning motor MT and so on serve as the working actuators. The first traveling motor ML, second traveling motor MR and so on serve as the traveling actuators. For convenience of description, the hydraulic circuits for some hydraulic actuators including the dozer cylinder, swing cylinder C2, turning motor MT, first traveling motor ML, second traveling motor MR and so on are omitted from the hydraulic system of FIG. 1.

Referring to FIG. 1, the hydraulic system of the working machine 1 includes a first hydraulic pump P1, a second hydraulic pump P2, a hydraulic fluid tank T and control valves 33. The first hydraulic pump P1 delivers hydraulic fluid. More specifically, the first hydraulic pump P1 supplies hydraulic fluid to the working hydraulic actuators and the travel hydraulic actuators. The first hydraulic pump P1 is either a fixed displacement pump or a variable displacement pump, for example. The second hydraulic pump P2 supplies hydraulic fluid serving as pilot fluid which functions as signals or is used for controlling the valves. The hydraulic fluid tank T reserves hydraulic fluid. The control valves 33 are provided for controlling the working hydraulic actuators and the traveling hydraulic actuators. The first hydraulic pump P1 is fluidly connected to the control valves 33 via a fluid line 34.

Referring to FIG. 1, the control valves 33 include a boom control valve 33A for controlling the boom cylinder C3, an arm control valve 33B for controlling the arm cylinder C4, an attachment control valve 33C for controlling the attachment cylinder C5, and a first flow control valve 33D and a second flow control valve 33E adaptable to control the attachment 17.

Referring to FIG. 1, the boom control valve 33A is fluidly connected to the boom cylinder C3 via a fluid line 41. The arm control valve 33B is fluidly connected to the arm cylinder C4 via a fluid line 42. The attachment control valve 33C is fluidly connected to the attachment cylinder C5 via a fluid line 43. The first flow control valve 33D can be fluidly connected to the optional attachment 17 via a first fluid line 44. The second fluid control valve 33E can be fluidly connected to the optional attachment 17 via a second fluid line 45. If the attachment 17 is that of the kind with no hydraulic actuator, e.g., the bucket X1, neither the first flow control valve 33D nor the second fluid control valve 33E is fluidly connected to the attachment 17. If the attachment 17 is that of the kind with a single hydraulic actuator, e.g., the tilt bucket X2, breaker X3, clamshell X4, auger X5, grapple X6, brushcutter X8 or thumb X9, either the first flow control valve 33D or the second flow control valve 33E is fluidly connected to the attachment 17, and the other is not fluidly connected to the attachment 17. If the attachment 17 is that of the kind with two or multiple hydraulic actuators, e.g., the rotary grapple X7, both the first flow control valve 33D and the second flow control valve 33E are fluidly connected to the attachment 17.

Referring to FIG. 1, each of the control valves 33 has respective pressure receiving portions fluidly connected to respective solenoid valves, e.g., boom solenoid valves 37A, arm solenoid valves 37B, attachment solenoid valves 37C, first solenoid valves 37D and second solenoid valves 37E. Each solenoid valve is fluidly connected to the second hydraulic pump P2 via a pilot fluid line 46 so as to apply a variable pilot pressure to the pressure receiving portion of the corresponding control valve 33. An opening degree of each of the solenoid valves can be changed to change the pilot pressure for the corresponding control valve 33.

The boom control valve 33A, arm control valve 33B, attachment control valve 33C, first flow control valve 33D and second control valve 33E are switching valves with linear spools, for example. Each of the control valves 33 receives pilot fluid applied to its pressure receiving portions via the corresponding solenoid valves to change the flow direction of hydraulic fluid supplied thereto, thereby controlling the flow rate or so on of hydraulic fluid supplied to the corresponding working hydraulic actuator, e.g., the boom cylinder C3, arm cylinder C4, attachment cylinder C5 or attachment 17.

The working hydraulic actuators are controlled by operating the operation devices 19L and 19R. The operation device 19L includes a left operation lever 40L, serving as one operation member, tiltably supported by the operation console 18L, and a first detection unit 40a for detecting the tilt degree of the left operation lever 40L. The left operation lever 40L is tiltable relative to the operation console 18L forward, rearward, leftward and rightward from its neutral position. The first detection unit 40a is a potentiometer for detecting the forward, rearward, rightward or leftward tilt degree, i.e., operation degree, of the left operation lever 40L from the neutral position.

When an operator operates the left operation lever 40L, the operation degree and direction of the left operation lever 40L are detected by the first detection unit 40a and are inputted to a control unit 55 including a CPU (Central Processing Unit) and so on. In correspondence to the operation degree and direction of the left operation lever 40L, the control unit 55 controls excitation of solenoids of the arm solenoid valves 37B fluidly connected to the pressure receiving portions of the arm control valve 33B, thereby controlling the opening degrees of the arm solenoid valves 37B. Accordingly, a pilot pressure is applied to the corresponding pressure receiving portion of the arm control valve 33B so as to shift the position of the arm control valve 33B, thereby telescoping the arm cylinder C4 in correspondence to the position of the arm control valve 33B.

The operation device 19R includes a right operation lever 40R, serving as another operation member, tiltably supported by the operation console 18R, and a second detection unit 40b for detecting the tilt degree of the right operation lever 40R. The right operation lever 40R is tiltable relative to the operation console 18R forward, rearward, leftward and rightward from its neutral position. The second detection unit 40b is a potentiometer for detecting the forward, rearward, rightward or leftward tilt degree, i.e., operation degree, of the right operation lever 40R from the neutral position.

When an operator operates the right operation lever 40R, the operation degree and direction of the right operation lever 40R are detected by the second detection unit 40b and are inputted to the control unit 55. In correspondence to the operation degree and direction of the right operation lever 40R, the control unit 55 controls excitation of solenoids of the boom solenoid valves 37A fluidly connected to the pressure receiving portions of the boom control valve 33A, thereby controlling the opening degrees of the boom solenoid valves 37A. Accordingly, a pilot pressure is applied to the corresponding pressure receiving portion of the boom control valve 33A so as to shift the position of the boom control valve 33A, thereby telescoping the boom cylinder C3 in correspondence to the position of the boom control valve 33A.

Also, when an operator operates the right operation lever 40R, in correspondence to the operation degree and direction of the right operation lever 40R detected by the second detection unit 40b and inputted to the control unit 55, the control unit 55 controls excitation of solenoids of the attachment solenoid valves 37C fluidly connected to the pressure receiving portions of the attachment control valve 33C, thereby controlling the opening degrees of the attachment solenoid valves 37C. Accordingly, a pilot pressure is applied to the corresponding pressure receiving portion of the attachment control valve 33C so as to shift the position of the attachment control valve 33C, thereby telescoping the attachment cylinder C5 in correspondence to the position of the attachment control valve 33C.

The present embodiment is described on the assumption that it is configured to control the opening degrees of the control valves 33 by means of the solenoid valves. However, the embodiment is not limited to the described configuration. For example, the operation levers 40L and 40R may be provided with respective operation valves for controlling pilot pressures in correspondence to the operation degrees thereof, thereby controlling the opening degrees of the respective control valves by means of the pilot pressures controlled by the operation valves.

The operation levers 40L and 40R are provided with a plurality of slide switches 20L and 20R serving as operation members. The plurality of slide switches 20L and 20R are variable resistors, e.g., slide volumes, which can detect movement or operation degrees. The plurality of slide switches 20L and 20R are disposed movably in the lateral direction. According to the present embodiment, first and second slide switches 20L and 20R serve as the plurality of slide switches 20L and 20R. The first slide switch 20L is disposed at an upper portion of the operation device 19L, and the second slide switch 20R is disposed at an upper portion of the operation device 19R.

The first slide switch 20L serving as a left operation switch is operable in either a first operation direction, i.e., one direction, or a second operation direction, i.e., another direction. When an operator operates the first slide switch 20L, signals regarding the operation degree and direction of the first slide switch 20L are inputted into the control unit 55. In correspondence to the operation degree and direction of the first slide switch 20L, the control unit 55 controls excitation of solenoids of the first solenoid valves 37D fluidly connected to the pressure receiving portions of the first flow control valve 33D so as to control the opening degrees of the first solenoid valves 37D. Accordingly, a pilot pressure is applied to the corresponding pressure receiving portion of the first flow control valve 33D so as to shift the position of the first flow control valve 33D, thereby controlling the attachment 17 in correspondence to the position of the first flow control valve 33D.

The second slide switch 20R serving as a right operation switch is operable in either a third operation direction, i.e., one direction, or a fifth operation direction, i.e., another direction. When an operator operates the second slide switch 20R, signals regarding the operation degree and direction of the second slide switch 20R are inputted into the control unit 55. In correspondence to the operation degree and direction of the second slide switch 20R, the control unit 55 controls excitation of solenoids of the second solenoid valves 37E fluidly connected to the pressure receiving portions of the second flow control valve 33E so as to control the opening degrees of the second solenoid valves 37E. Accordingly, a pilot pressure is applied to the corresponding pressure receiving portion of the second flow control valve 33E so as to shift the position of the second flow control valve 33E, thereby controlling the attachment 17 in correspondence to the position of the second flow control valve 33D.

As mentioned above, the boom 15, arm 16 and attachment 17 can be controlled by operating the operation levers 40L and 40R and the slide switches 20L and 20R. If the attachment 17 is that of the kind having a single hydraulic actuator, such as the tilt bucket X2, breaker X3, clamshell X4, auger X5, grapple X6, brushcutter X8 or thumb X9, only one of the first and second flow control valves 33D and 33E is fluidly connected to the attachment 17, so that the hydraulic actuator of the attachment 17 can be controlled by operating corresponding one of the first and second slide switches 20L and 20R. If the attachment 17 is that of the kind having two or a plurality of hydraulic actuators, such as the rotary grapple X7, both the first and second flow control valves 33D and 33E are fluidly connected to the attachment 17, so that the hydraulic actuators of the attachment 17 can be controlled by operating both the first and second slide switches 20L and 20R, respectively. If the attachment 17 is that of the kind having no hydraulic actuator, such as the bucket X1, the right operation lever 40R is operated to control the attachment cylinder C5 for controlling the attachment 17 because neither the first flow control valve 33D nor the second flow control valve 33E is fluidly connected to the attachment 17.

Referring to FIG. 1, the working machine 1 is provided with a switching valve 50 serving as a third line valve. Due to the shift operation of the switching valve 50, it can be selected whether hydraulic fluid discharged from the attachment 17 is drained to the hydraulic fluid tank T via the second flow control valve 33E or is discharged directly to the hydraulic fluid tank T bypassing the second flow control valve 33E. The switching valve 50 is a three-way valve, for example. The switching valve 50 is disposed on the second fluid line 45 and is shiftable between a first position 50a and a second position 50b. When the switching valve 50 is set at the first position 50a, the switching valve 50 fluidly connects a discharge port of the hydraulic actuator of the attachment 17 to the second flow control valve 33E, so that the hydraulic fluid discharged from the attachment 17 is drained to the hydraulic fluid tank T via the second fluid line 45, the switching valve 50 and the second flow control valve 33E. When the switching valve 50 is set at the second position 50b, the switching valve 50 fluidly connects the discharge port of the hydraulic actuator of the attachment 17 to the hydraulic fluid tank T, so that the hydraulic fluid discharged from the attachment 17 is directly drained to the hydraulic fluid tank T bypassing the second flow control valve 33E.

According to the present embodiment, the switching valve 50 is disposed on the second fluid line 45. Alternatively, the switching valve 50 may be disposed on the first fluid line 44. Alternatively, switching valves 50 may be disposed on the first and second fluid lines 44 and 45, respectively. When the switching valve 50 on the first fluid line 44 is set at the first position 50a, the switching valve 50 fluidly connects a discharge port of the hydraulic actuator of the attachment 17 to the first flow control valve 33D, so that the hydraulic fluid discharged from the attachment 17 is drained to the hydraulic fluid tank T via the first fluid line 44, the switching valve 50 and the first flow control valve 33D. When the switching valve 50 on the first fluid line 44 is set at the second position 50b, the switching valve 50 fluidly connects the discharge port of the hydraulic actuator of the attachment 17 to the hydraulic fluid tank T, so that the hydraulic fluid discharged from the attachment 17 is directly drained to the hydraulic fluid tank T bypassing the first flow control valve 33D.

Figure 2:
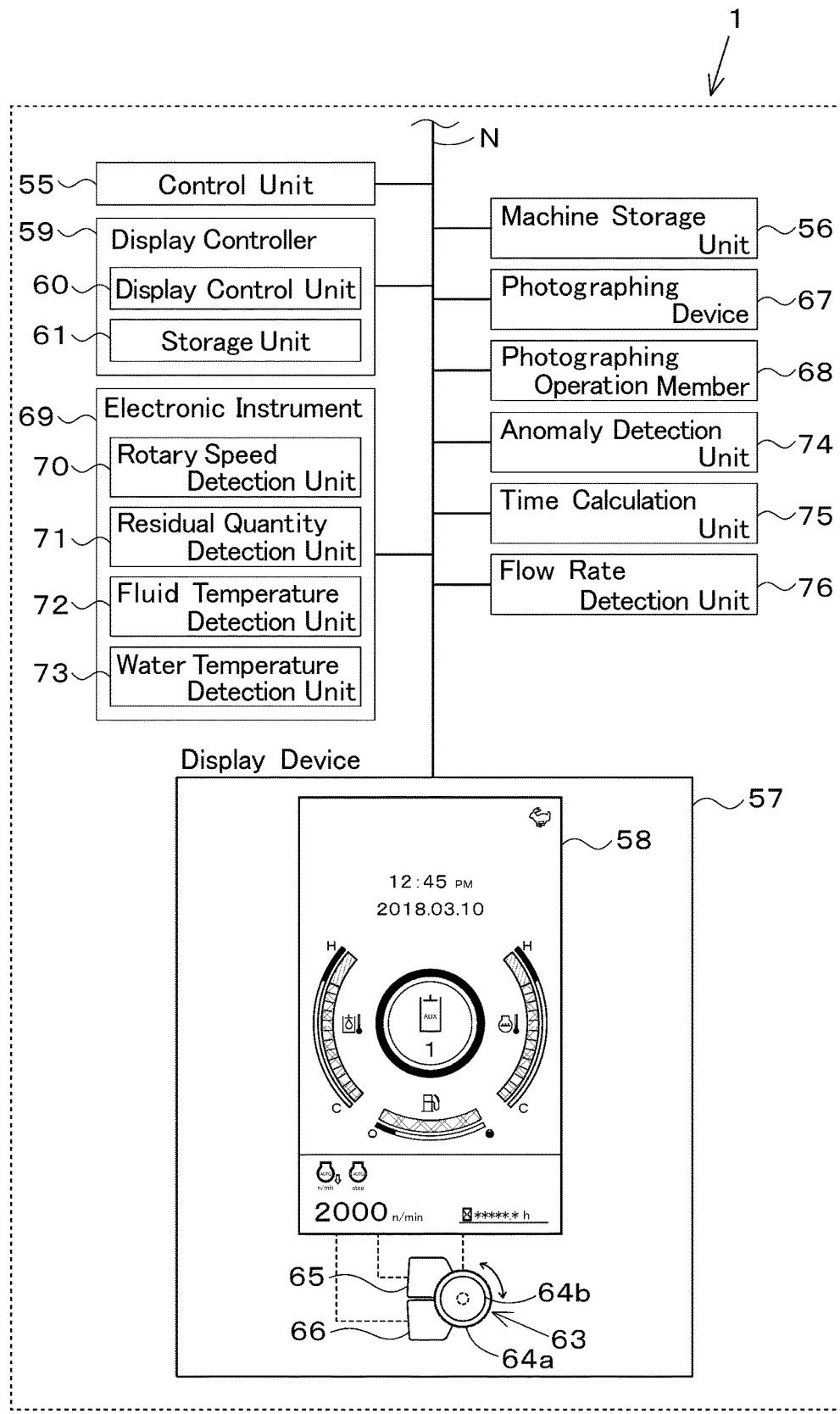
FIG. 2 is a schematic control block diagram of the working machine.

FIG. 2 is a schematic control block diagram of the working machine 1. Referring to FIG. 2, the working machine 1 includes the control unit 55, a machine storage unit 56, a display 57, a display controller 59, display operation members 63, a photographing device 67, a photographing operation member 68, an electronic instrument 69, an anomaly detection unit 74, a time calculation unit 75 and a flow rate setting unit 76. The control unit 55, machine storage unit 56, display 57, display controller 59, display operation members 63, photographing device 67, photographing operation member 68, electronic instrument 69, a normal detection unit 74, time calculation unit 75 and flow rate setting unit 76 can communicate with one another by an in-vehicle communication network N such as CAN (Controller device Area Network) or FlexRay.

The control unit 55, including a CPU and/or so on, functions to control the working machine 1 in various ways. The machine storage unit 56, including a nonvolatile memory and/or so on, stores various information regarding the working machine 1. Various application software such as an operating system are stored in the machine storage unit 56.

The display 57 includes a display screen 58 for displaying various items regarding the working machine 1, such as the various information regarding the working machine 1, and for inputting various settings regarding the working machine 1. The display screen 58 of the display 57 is disposed at a position visible to an operator sitting on the operator seat 6 in the cabin 5. For example, the display screen 58 is disposed forward, forwardly slantwise, or sideward from the operator seat 6. The display screen 58 is formed in a rectangular shape and is provided on a panel such as a liquid crystal panel. The display screen 58 is transitionable to various screens.

The display controller 59 controls a content displayed on the display 57. The display controller 59 includes a display control unit 60 which commands the display 57 to display information regarding the working machine 1. The display control unit 60 includes a CPU for executing commands of display control programs, a ROM (read only memory) storing computer programs, a RAM (random access memory) for developing various commands of control programs, and a storage unit 61 storing various control programs and various data. A storage medium, e.g., a memory, serves as the storage unit 61. The display control unit 60 may be disposed in either a common housing of the display 57 or a housing separated from the display 57. The display control unit 60 may serve as either a part of the control unit 55 for general control of the working machine 1 or a unit separated from the control unit 55 in communication of various pieces of information thereto. The storage unit 61 stores various pieces of information regarding the display 57. Also, the storage unit 61 stores an operating system and various kinds of application software.

Some switches serve as the display operation members 63 for inputting instructions to the display controller 59. An operation signal outputted from each display operation member 63 is inputted to the display control unit 60 of the display controller 59. Referring to FIG. 2, the display operation members 63 include a rotary operation member 64b, a pressing operation member 64b, a menu switch 65 and a return switch 66. For example, a dial switch or a rotary selector switch may serve as the rotary operation member 64a. A push button that is depressingly operable may serve as the pressing operation member 64b. The pressing operation member 64b is disposed at a central portion of the rotary operation member 64a, for example. The menu switch 65 is a push button for inputting instruction to the display controller 59, thereby commanding the display 57 to display a later-discussed menu image 140. The return switch 66 is a push button for inputting instruction to the display controller 59, thereby commanding the display 57 to transition for redisplaying the preceding screen. Referring to FIG. 2, the rotary operation member 64a, pressing operation member 64b, menu switch 65 and return switch 66 are juxtaposed to adjoin one another, for example. The menu switch 65 and return switch 66 are vertically juxtaposed. The rotary operation member 64a and pressing operation member 64b are disposed rightward from the menu switch 65 and return switch 66. The display operation members 63 are disposed at positions convenient for operation by an operator sitting on the operator seat 6. For example, the display operation members 63 may be provided on the respective operation consoles 18L and 18R. The display operation members 63 are not limited to those having the above-mentioned configuration. For example, the rotary operation member 64a may be able to be depressed so as to also serve as the pressing operation member 64b. If the display screen 58 is provided as a touch panel, some or all of the display operation members 63 may be graphic images displayed on the display screen 58.

The photographing device 67 is a camera or so on provided on the machine body 2 to photograph surroundings of the machine body 2. For example, the photographic device 67 is disposed at a rear portion of the working machine 1 so as to photograph something rearward from the working machine 1. Alternatively, the photographing device 67 may be a camera or so on disposed at a front, lateral side, or upper portion of the working machine 1 so as to photograph surroundings of the working device 4. In this case, the photographing device 67 is disposed at a front portion of the cabin 5 so as to photograph the surroundings of the boom 15, arm 16 and attachment 17. Alternatively, the photographing device 67 may be provided on a lateral side portion of the working machine 1 so as to photograph the lateral side of the working machine 1. A photographic image photographed by the photographing device 67 is inputted to the display controller 59 and is processed by the displayer controller device 59, and the display control unit 60 commands the display 57 to display the photographed image.

The photographing operation member 68 as well as the display operation members 63 is a switch for inputting instruction to the display controller 59. An operation signal from the photographing operation member 68 is inputted to the display control unit 60 of the display controller 59, thereby determining whether a photographed image 125 is to be displayed or not. For example, the photographing operation member 68 is a push button disposed at a position, e.g., on the operation console 18L or 18R, convenient for operation by the operator sitting on the operator seat 6.

The electronic instrument 69 is an instrument for obtaining various pieces of information regarding devices, instruments and so on in the working machine 1, e.g., the rotary speed of the engine E, the temperature of hydraulic fluid, the temperature of engine cooling water, and the residual quantity of fuel for driving the engine E. The electronic instrument 69 inputs information to the control unit 55. The control unit 55 processes the inputted information and outputs the processed information to the display controller 59. Referring to FIG. 2, the electronic instrument 69 according to the present embodiment includes a rotary speed detection unit 70 for detecting the rotary speed of the engine E, a residual quantity detection unit 71 for detecting the residual quantity of fuel, a fluid temperature detection unit 72 for detecting the temperature of hydraulic fluid flowing in the hydraulic circuits, and a water temperature detection unit 73 for detecting the temperature of cooing water for the engine E. Instead of or in addition to the water temperature detection unit 73, a detection unit for detecting the temperature of engine oil in the engine E may be provided. Each of the detection units is not limited to that having the above-mentioned configuration. Any kind of known conventional detection means may serve as each of the detection units.

The anomaly detection unit 74 detects a predetermined warning condition if it occurs. For example, the warning condition to be detected by the anomaly detection unit 74 is anomaly or malfunction of an instrument installed in the working machine 1, e.g., an electronic component such as a sensor, switch or buttery serving as the rotary speed detection unit 70, fluid temperature detection unit 72 or so on. More specifically, for example, the warning condition is a status where a value outputted from the electronic component deviates from a predetermined threshold range. In this regard, when the anomaly detection unit 74 detects that the outputted value deviates from the threshold range, the anomaly detection unit 74 judges that the warning condition or event occurs in the working machine 1. Moreover, for example, disconnection, short-circuit or so on of a sensor or switch is to be detected as the warning condition by the anomaly detection unit 74. In this regard, anomaly of the residual quantity detection unit 74, e.g., disconnection or short-circuit of the corresponding switch, or the residual quantity of fuel not more than a threshold, is detected as the warning condition by the anomaly detection unit 74. Also, a status where the temperature detected by the fluid temperature detection unit 72 or water temperature detection unit 73 exceeds the threshold range because of overheat of the engine E or another reason is detected as the warning condition by the anomaly detection unit 74. The warning condition detected by the anomaly detection unit 74 is inputted to the control unit 55. The warning condition inputted to the control unit 55 is outputted to the display control unit 60 of the display controller 59 as warning information of which an operator is warned.

The time calculation unit 75 is a timer for counting a current date, time or so on. The time calculation unit 75 includes an electric or electronic component, a program and/or so on installed in the control unit 55. Also, the time calculation unit 75, e.g., an hour meter, has the function to calculate a working time, i.e., a total operation time of the working machine 1. Each of the current date and time and the working time calculated by the time calculation unit 75 is inputted to the display control unit 60, is processed by the display control unit 60 and is indicated on the display screen 58.

The flow rate setting unit 76 uses a preset control map, for example, to variably set maximum flow rates of hydraulic fluid between the corresponding control valve 33 and the attachment 17 in correspondence to the operation of the first and second slide switches 20L and 20R. More specifically, a first supply flow rate and a second supply flow rate can be set by means of the flow rate setting unit 76. The first supply flow rate is defined as the maximum flow rate level of hydraulic fluid supplied to the attachment 17 when the first slide switch 20L is operated in the first operation direction at a predetermined stroke or more. The second supply flow rate is defined as the maximum flow rate of hydraulic fluid supplied to the attachment 17 when the first slide switch 20L is operated in the second operation direction at a predetermined stroke or more. Also, a third supply flow rate and a fourth supply flow rate can be set by means of the flow rate setting unit 76. The third supply flow rate is defined as the maximum flow rate of hydraulic fluid supplied to the attachment 17 when the second slide switch 20R is operated in the second operation direction at a predetermined stroke or more. The fourth supply flow rate is defined as the maximum flow rate of hydraulic fluid supplied to the attachment 17 when the second slide switch 20R is operated in the fourth operation direction at a predetermined stroke or more.

In summary, the control unit 55 controls actions of the first and second flow rate control valves 33D and 33E serving as the control valves 33 based on the preset first to fourth supply flow rates and the operation directions and degrees of the slide switches 20L and 20R, thereby controlling hydraulic fluid supplied to the attachment 17. According to the present embodiment, by means of the flow rate setting unit 76, an operator can optionally set the first to fourth flow rates based on his/her setting operation of the display operation member 63. Referring to FIG. 16, the setting contents by means of the flow rate setting unit 76 are the maximum flow rate levels of hydraulic fluid each of which is determined in correspondence to each kind of optional attachment 17, in correspondence to each of the slide switches 20L and 20R, and in correspondence to each of the operation directions for operating each of the slide switches 20L and 20R. The setting contents by means of the flow rate setting unit 76 are associated with respective pieces of information individually identifying the respective kinds of attachments 17 and are stored in the storage unit 61 of the display control unit 60. In this way, the storage unit 61 stores the kinds of attachments 17 available to be attached to the working machine 1, and the setting contents of the maximum flow rate levels corresponding to the respective kinds of attachments 17. Alternatively, the setting contents by means of the flow rate setting unit 76 may be stored in the machine storage unit 56. Alternatively, the setting contents by means of the flow rate setting unit 76 individually associated with the respective pieces of information for identifying the respective kinds of attachments 17 may be stored in the machine storage unit 56 or the storage unit 61 of the display control unit 60. The stored setting contents can be changed or regulated by operating the display operation member/members 63.

Screens which the display 57 displays on the display screen 58 based on the command from the display control unit 60 of the display controller 59 will now be described mainly with reference to FIGS. 3 to 15.

Referring to FIGS. 3 to 15, the display control unit 60 of the display controller 59 commands the display 57 to display one screen on the display screen 58, the one screen being selected from an operation screen Q1 which is displayed during a normal work by an operator operating the working machine 1, a photographed image screen Q2 which displays a photographed image 125 photographed by the photographing device 67, a setting screen Q3 which is displayed during a setting operation of any device or instrument in the working machine 1 (see FIG. 15), a first warning detailed screen Q4, a warning confirmation screen Q5, a second detailed warning screen Q6, list screens Q7 including a flow rate selection screen Q7A and an object selection screen Q7B, a setting completion screen Q8 and so on. In the following description, the state where the operation screen Q1 is displayed on the display screen 58 is referred to as a first display state, the state where the photographed image screen Q2 is displayed on the display screen 58 is referred to as a second display state, and the state where the operation screen Q1 or photographed image screen Q2 is displayed on the display screen 58 is referred to as a normal display state.

Figure 3:
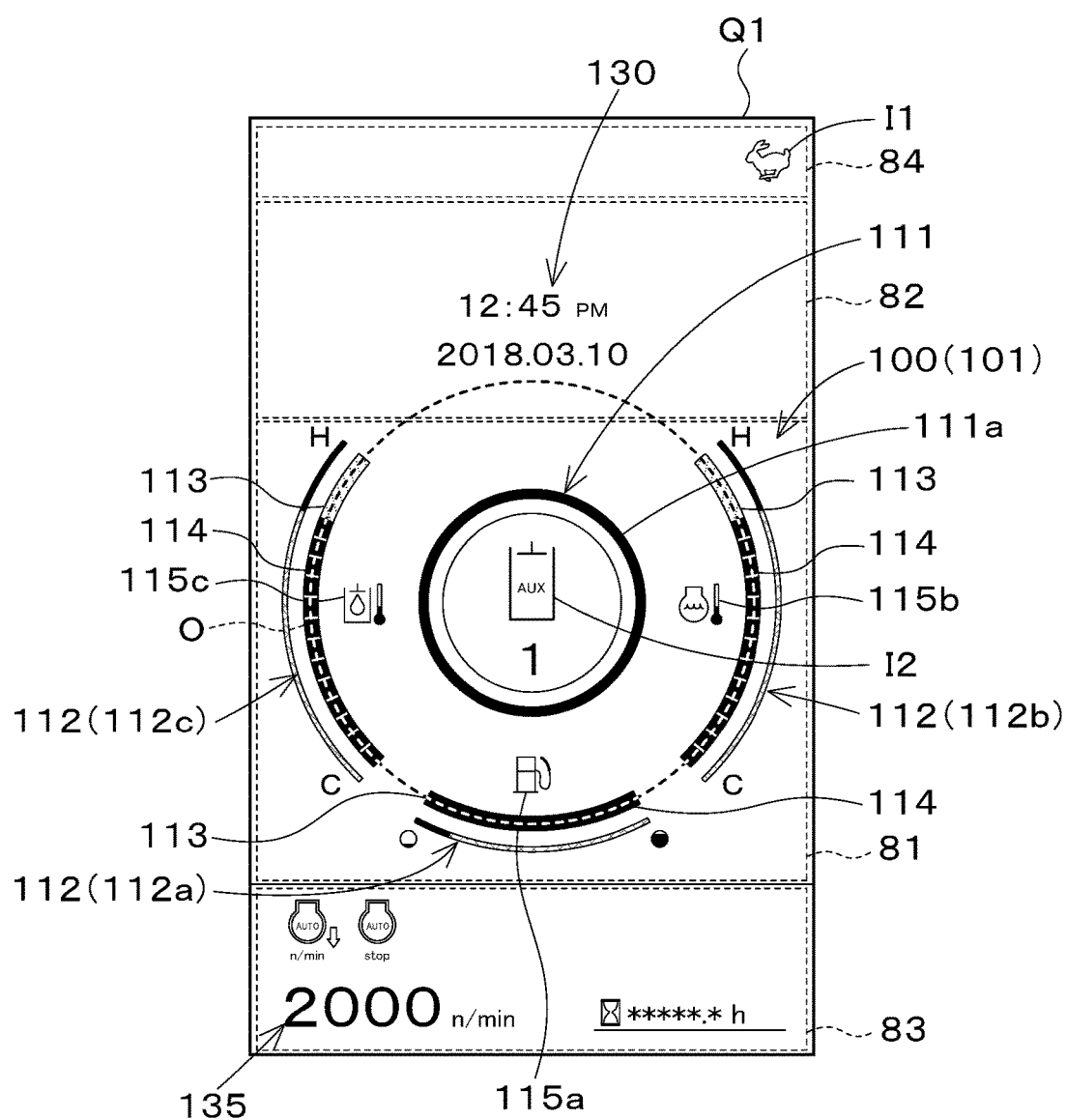
FIG. 3 illustrates an example of a display screen in a first display state.

Referring to FIGS. 3 to 8 and other figures, the display control unit 60 is configured to display fitting images in a first display region 81, a second display region 82, a third display region 83 and a fourth display region 84, respectively. Referring to FIG. 3, 4 and other figures, the first display region 81 is provided at a constant position regardless of whether it is set in the first display state displaying the operation screen Q1 or the second display state displaying the operation screen Q2. According to the present embodiment, the first display region 81 is larger than the second, third and fourth display regions 82, 83 and 84. The second display region 82 is disposed adjacently above the first display region 81. The third display region 83 is disposed adjacently below the first display region 81. The third display region 83 is substantially as large as the second display region 82. Referring to FIGS. 3 to 8 and other figures, the fourth display region 84 is disposed adjacently above the second display region 82. In the fourth display region 84, icons I1 corresponding to respective kinds of notification information, including a vehicle speed level, an alarm of unwear of a seatbelt, and so on, are displayed. According to the present embodiment, the icon I1 indicating the vehicle speed level is either a rabbit-shaped icon displayed when the vehicle speed equals or exceeds the predetermined value or a turtle-shaped icon displayed unless the vehicle speed exceeds a predetermined value. The icons I1 are juxtaposed in the lateral direction. Each icon I1 is color-changed in correspondence to the importance level of information. For example, the icon I1 is displayed in red when it indicates greatly important information, and it is displayed in yellow when the importance level of information is reduced. The icon I1 indicating the vehicle speed level is displayed in green, for example.

Referring to FIGS. 3 to 8, the display control unit 60 is configured to indicate various information in the first, second and third display regions 81, 82 and 83, respectively. The display control unit 60 is configured to display work indicating images 100 on a certain screen. According to the present embodiment, the certain screen is either the operation screen Q1 or the photographed image screen Q2. The work indicating images 100 indicate respective pieces of work information as the pieces of information regarding the working machine 1. According to the present embodiment, the pieces of work information include a rotary speed of the engine E, a fuel residual quantity, a temperature of hydraulic fluid hereinafter referred to as "fluid temperature", a temperature of cooling water for the engine E hereinafter referred to as "water temperature", and so on. The work information to be indicated on the display screen 58 of the display 57 by means of the display control unit 60 is not restricted only if it may be defined as the information regarding the working machine 1. Accordingly, the work information may include information regarding the attachment 17, boom cylinder C3, arm cylinder C4, first traveling motor ML, second traveling motor MR, turning motor MT and/or so on. In this case, the information indicated by means of the display 57 may include a boom angle, an arm angle, a traveling speed and a turning speed, for example. The following description is based on an assumption that the work indicating images 100 (on the operation screen Q1) displayed in the first display state are referred to as first work indicating images 101, and the work indicating images 100 (on the photographed image screen Q2) displayed in the second display state are referred to as second work indicating images 102.

Referring to FIG. 3, the display control unit 60 is configured to display, in the first display state (i.e., on the operation screen Q1), the first work indicating images 101 in the first display region 81 so that the first work indicating images 101 include an icon image 111 serving as a hydraulic pressure indicating image and a plurality of graphic meter images 112. The icon image 111 indicates information regarding the working machine 1. More specifically, the icon image 111 indicates the attachment 17 attached to the working machine 1. Different figures corresponding to various kinds of attachments 17 are prepared, and the icon image 111 indicates one figure corresponding to the kind of attachment 17 which is actually attached to the working machine 1. An icon 12 is a figure expressing a simplified appearance of the corresponding kind of attachment 17 so that an operator can intuitively recognize what kind of attachment 17 is meant by the icon 12 in the icon image 111. The icon image 111 includes an emphasis portion 111a for emphasizing what it indicates. The emphasis portion 111a is circularly outlined and the icon 12 is arranged within the emphasis portion 111a to be surrounded by the circular outline of the emphasis portion 111a.

Referring to FIG. 3, the display control unit 60 is configured to display, in the first display state, the plurality of graphic meter images 112 in the first display region 81. The plurality of graphic meter images 112 indicate respective conditions of the working machine 1 corresponding to the information outputted from the electronic instrument 69. More specifically, the display control unit 60 is configured to display the plurality of graphic meter images 112 surrounding the icon image 111 displayed at a central portion of the first display region 81. The display control unit 60 is configured so that the plurality of graphic meter images 112 displayed in the first display region 81 include a first graphic meter image 112a arranged below the icon image 111, a second graphic meter image 112b arranged rightward from the icon image 111, and a third graphic meter image 112c arranged leftward from the icon image 111. The display control unit 60 is configured to display the graphic meter images 112 each in an arcuate shape so that the arcuate graphic meter images 112 are arranged so as to surround the icon image 111. The arcuate graphic meter images 112 have substantially the same radius and are arranged to collectively form an outline of a common phantom circle O (as a dotted lined circle in FIG. 3) having its center at a central portion of the icon image 111 and each of the graphic meter images 112 defines a part of the phantom circle O. Further, the display control unit 60 is configured to display second graphic meter image 112b and the third graphic meter image 112c symmetrically with respect to a straight line extending in the vertical direction of the display screen 58 and intersecting the center of the icon image 111.

Referring to FIG. 3, of the plurality of graphic meter images 112, the first graphic meter image 112a indicates fuel information which means a piece of information regarding a residual quantity of fuel, and the second and third graphic meter images 112b and 112c indicate temperature information which means pieces of information regarding the respective kinds of temperatures. In summary, the display control unit 60 is configured to display the first graphic meter image 112a indicating the fuel information between the second graphic meter image 112b and third graphic meter image 112c indicating the respective pieces of temperature information. The temperature information indicated by the second graphic meter image 112b means indication of the water temperature which is the temperature of engine cooling water. The temperature information indicated by the third graphic meter image 112c means indication of the temperature of hydraulic fluid.

Referring to FIG. 3, the display control unit 60 is configured to display meter icon images 115a to 115c corresponding to respective pieces of information indicated by the respective graphic meter images 112 adjacently to the respective graphic meter images 112. More specifically, the display control unit 60 is configured to display the meter icon images 115a to 115c so that the meter icon image 115a is displayed adjacently to the first graphic meter image 112a (according to the present embodiment, between the first graphic meter image 112a and the emphasis portion 111a) so as to make the first graphic meter image 112a recognized as indicating the residual quantity of fuel, the meter icon image 115b is displayed adjacently to the second graphic meter image 112b (according to the present embodiment, between the second graphic meter image 112b and the emphasis portion 111a) so as to make the second graphic meter image 112b recognized as indicating the water temperature of cooling water, and the meter icon image 115c is displayed adjacently to the third graphic meter image 112c (according to the present embodiment, between the third graphic meter image 112c and the emphasis portion 111a) so as to make the third graphic meter image 112c recognized as indicating the temperature of hydraulic fluid.

Each of the first, second and third graphic meter images 112a, 112b and 112c includes a first scale 113 and a first index 114 which indicates the work information regarding the working device 4 in association with the first scale 113. More specifically, the display control unit 60 is configured to display the first graphic meter image 112a with its first index 114 which is extendable rightward along its first scale 113 according to increase of fuel in a fuel tank and which is contractable leftward along its first scale 113 according to reduction of fuel in the fuel tank. The display control unit 60 is configured to display the second graphic meter image 112a with its first index 114 which is extendable upward along its first scale 113 according to increase of the water temperature and which is contractable downward according to reduction of the water temperature. The display control unit 60 is configured to display the third graphic meter image 112c with its first index 114 which is extendable upward along its first scale 113 according to increase of the temperature of hydraulic fluid and which is contractable downward along its first scale 113 according to reduction of the temperature of hydraulic fluid.

According to the present embodiment, the display control unit 60 is configured to display the plurality of graphic meter images 112 to indicate the residual quantity of fuel, the fluid temperature, i.e., the temperature of hydraulic fluid, and the water temperature, i.e., the temperature of cooling water for the engine E. The display control unit 60 may be configured to display one, some or all of the graphic meter images 112 to indicate other information regarding any instrument or device installed in the working machine 1. Such other information may be indicated in addition to the above-mentioned information indicated by the above-mentioned graphic meter images 112. For example, the graphic meter images 112 may be displayed to indicate a voltage of a battery in the working machine 1, a temperature of engine oil for the engine E, and/or so on. For example, the second graphic meter image 112b may be displayed to indicate the temperature of engine oil for the engine E instead of the water temperature of engine cooling water.

Figure 4:
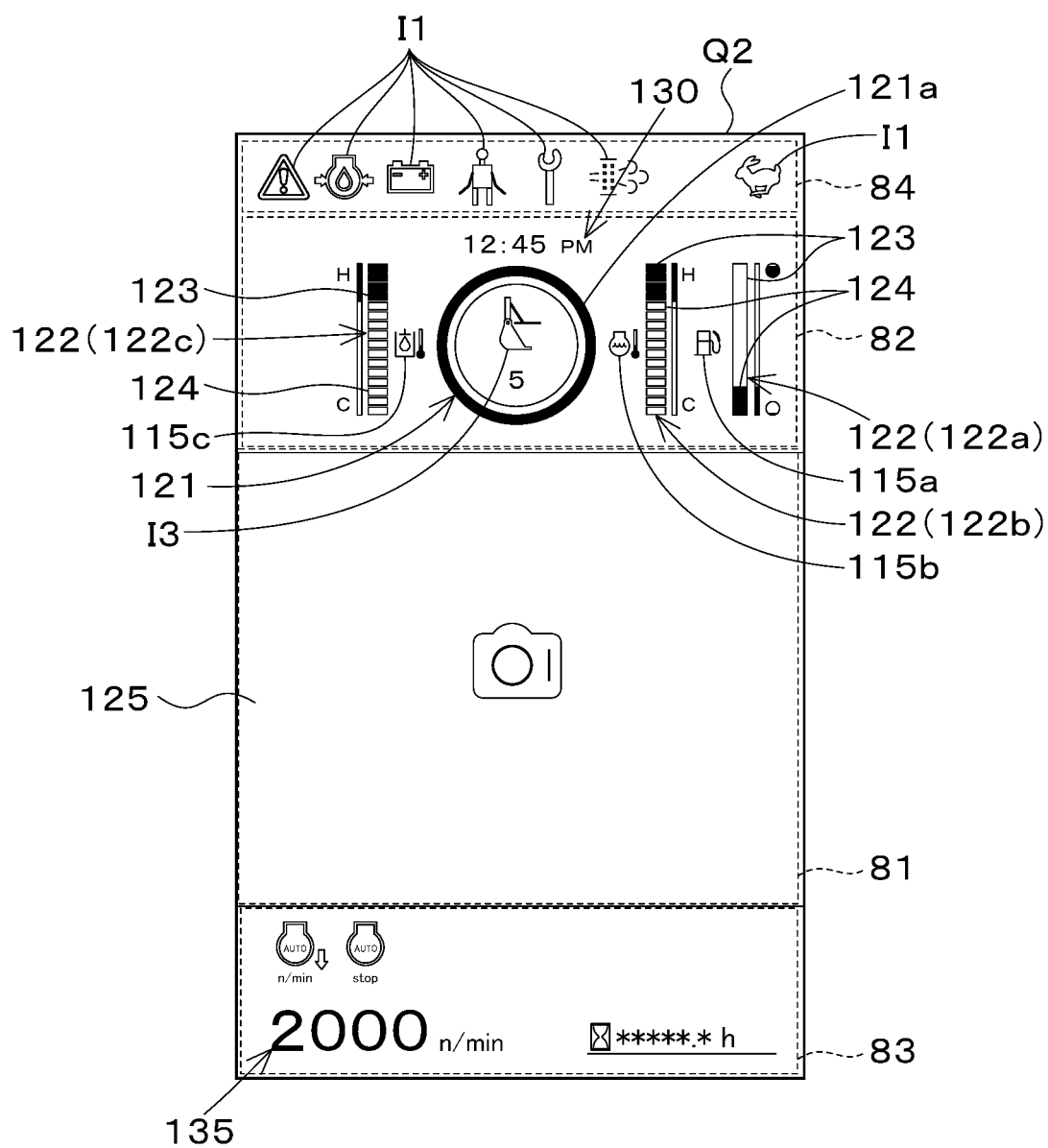
FIG. 4 illustrates an example of the display screen in a second display state.

Referring to FIG. 4, the display control unit 60 is configured to display, in the second display state (i.e., on the photographed image screen Q2) the second work indicating images 102 in the second display region 82 so that the second work indicating images 102 include an icon image 121 serving as a fluid temperature indicating image and a plurality of bar images 122. The icon image 121 indicates information regarding the attachment 17. More specifically, the icon image 121 indicates the same individual information as individual information regarding the kind of attachment 17 indicated by the icon image 111 on the operation screen Q1. Referring to FIG. 4, the display control unit 60 is configured to display the icon image 121 including an icon 13 indicating the kind of attachment 17 attached to the tip portion of the arm 16. The icon 13 is a figure expressing a simplified appearance of the corresponding attachment 17, similar to the icon 12 displayed in the icon image 111. The icon image 121 includes an emphasis portion 121a for emphasizing what it indicates. The emphasis portion 121a is circularly outlined and the icon 13 is arranged within the emphasis portion 121a to be surrounded by the circular outline of the emphasis portion 121a.

Referring to FIG. 4, the display control unit 60 is configured to display one or some of the bar images 122 rightward from the icon image 121, and the other or others of the bar images 122 leftward from the icon image 121. The bar images 122 are bar-shaped images corresponding to respective pieces of information outputted from the electronic instrument 69. More specifically, the display control unit 60 is configured so that the plurality of bar images 122 displayed in the second display region 82 include a first bar image 122a arranged rightward from the icon image 121, a second bar image 122b arranged between the icon image 121 and first bar image 122a, and a third bar image 122c arranged leftward from the icon image 121 and second bar image 122b.

The display control unit 60 is configured to display, in the second display region 82, the first, second and third bar images 122a, 122b and 122c in the second display region 82 extending in the longitudinal direction of the display screen 58 of the display 57, i.e., in the vertical direction. The display control unit 60 is configured to display the bar images 122 at substantially the same position in the longitudinal direction of the display screen 58. More specifically, referring to FIG. 4, the display control unit 60 is configured to display the first, second and third bar images 122a, 122b and 122c so that top ends of the first, second and third bar images 122a, 122b and 122c are arranged at substantially the same position in the vertical direction, i.e., in the longitudinal direction of the display screen 58. Also, the display control unit 60 is configured to display the first, second and third bar images 122a, 122b and 122c so that bottom ends of the first, second and third bar images 122a, 122b and 122c are arranged at substantially the same position in the vertical direction, i.e., in the longitudinal direction of the display screen 58. Accordingly, the bar images 122 and the icon image 121 can be compactly arranged in the linear second display region 82 which is relatively narrow in the vertical width direction thereof, thereby ensuring a sufficiently large space as the first display region 81 for displaying the photographed image 125.

Referring to FIG. 4, the display control unit 60 is configured to display, in the second display state, the first, second and third bar images 122a, 122b and 122c in the second display region 82 so that the first bar image 122a indicates the same information as the information (i.e., the fuel residual quantity) indicated by the first graphic meter image 112a, the second bar image 122b indicates the same information as the information (i.e., the cooling water temperature) indicated by the second mete image 112b, and the third bar image 122c indicates the same information as the information (i.e., the hydraulic fluid temperature) indicated by the third graphic meter image 112c. In other words, referring to FIG. 4, the display control unit 60 is configured to display, in the second display state, the icon image 121 in the second display region 82 smaller than the first display region 81, and the bar images 122 indicating the same information as the information indicated by the graphic meter images 121 in the second display region 82 on both sides of the icon image 121.

The display control unit 60 is configured to display the meter icon images 115a to 115c corresponding to the respective pieces of information indicated by the respective bar images 122 adjacently to the respective bar images 122. More specifically, the display control unit 60 is configured to display the meter icon images 115a to 115c so that the meter icon image 115a is displayed adjacently to the first bar image 122a (according to the present embodiment, between the first bar image 122a and the second bar image 122b) so as to make the first bar image 122a recognized as indicating fuel, the meter icon image 115b is displayed adjacently to the second bar image 122b (according to the present embodiment, between the second bar image 122b and the icon image 121) so as to make the second bar image 122b recognized as indicating the water temperature of cooling water, and the meter icon image 115c is displayed adjacently to the third bar image 122c (according to the present embodiment, between the third bar image 122c and the icon image 121) so as to make the third bar image 122c recognized as indicating the temperature of hydraulic fluid.

Each of the bar images 122 includes a second scale 123 indicating a scale of information outputted from the electronic instrument 69 and a second index 124 indicating the work information regarding the working device 4 in correspondence to the second scale 123.

The display control unit 60 is configured to display the first bar image 122a with its second index 124 extendable and contractable vertically along its second scale 123 in correspondence to the fuel residual quantity. The display control unit 60 is configured to display the second bar image 122b with its second index 124 extendable and contractable vertically along its second scale 123 in correspondence to the water temperature. The display control unit 60 is configured to display the third bar image 122c with its second index 124 extendable and contractable vertically along its second scale 123 in correspondence to the temperature of hydraulic fluid.

As mentioned above, according to the present embodiment, the display control unit 60 is configured to display the plurality of bar images 122 to indicate the residual quantity of fuel, the fluid temperature, i.e., the temperature of operation fuel, and the water temperature, i.e., the temperature of cooling water for the engine E. However, the items indicated by the bar images 122 are not limited to those as mentioned above. The display control unit 60 may be configured to display the bar images 122 to indicate other information such as information regarding any instrument or device provided on the working machine 1 (e.g., a voltage of a battery in the working machine 1 or a temperature of engine oil for the engine E), information regarding an environment surrounding the working machine 1 (e.g., an air temperature or air humidity), information regarding a work site (e.g., an inclination angle), and/or so on. It is desired that at least the bar images 122 corresponding to the respective graphic meter images 112 displayed on the operation screen Q1 are displayed on the photographed image screen Q2. Therefore, an operator can easily grasp the contents indicated by the respective bar images 122. According to the present embodiment, the display control unit 60 is configured to display the second bar image 122b and the third bar image 122c arranged rightward and leftward from the icon image 121 so that the first bar image 122a is disposed rightward from the second bar image 122b. However, the arrangement of the plurality of bar images 122 is not limited to the above-mentioned arrangement.

Referring to FIG. 4, the display control unit 60 is configured to display, in the second display state (i.e., on the photographed image screen Q2), the photographed image 125 in the first display region 81. More specifically, the display control unit 60 is configured to set selectively either the first display state where the arcuate graphic meter images 112 indicating the respective conditions of the working machine 1 are displayed in the first display region 81 or the second display state where the photographed image 125 is displayed in the first display region 81. The photographed image 125 is an image photographed by the photographing device 67. For example, a photograph of the surroundings of the working machine 1 serves as the photographed image 125. Therefore, an operator can confirm the photographed image screen Q2 displaying both the photographed image 125 photographed by the photographing device 67 and the conditions of the working machine 1. According to the present embodiment, the working machine 1 has one photographing device 67. Alternatively, the working machine 1 may be equipped with a plurality of photographing devices 67. In this case, for example, a rotationally operable selector switch serves as the photographing operation member 68. According to rotational operation of the photographing operation member 68, the display control unit 60 commands to change the photographed image 125 displayed in the first display region 81 from one image photographed by one photographing device 67 to another image photographed by another photographing device 67.

Referring to FIGS. 3 and 4, in the first display state displaying the operation screen Q1 and in the second display state displaying the photographed image screen Q2, the display control unit 60 can command the display 57 to display a time indicating image 130. Specifically, in the first display state, the display control unit 60 commands that the time indicating image 130 is displayed in the second display region 82. On the other hand, in the second display state, the display control unit 60 commands that the time indicating image 130 is displayed in an upper portion of the second display region 82. More specifically, the display control unit 60 commands that the time indicating image 130 is displayed in an upper portion of the icon image 121. The time indicating image 130 indicates current date and time calculated by the time calculation unit 75. The time indicating image 130 indicates the current date and time by expressing numerals representing "Minute, Hour, Date, Month, Year". According to the present embodiment, the display 57 is commanded to display the current time on a 12-hour clock. By operating the display 57 to change the settings on the setting screen Q3, the current time on a 24-hour clock can be displayed.

Referring to FIGS. 3 and 4, in the normal display state, i.e., either the first or second display state, the display control unit 60 commands the display 57 to indicate supplementary information 135. More specifically, the display control unit 60 is configured to indicate the supplementary information 135 in an auxiliary display region. The auxiliary display region is arranged between a main display region and a peripheral edge portion of the display screen 58. The main display region includes the central portion of the display screen 58 in the normal display state. Either the graphic meter images 112 or the bar images 122 are displayed in the main display region to indicate the respective conditions of the working machine 1. In other words, according to the present embodiment, the main display region is defined as a region including both the first display region 81 and second display region 82, while the auxiliary display region is defined as the third display region 83.

The display control unit 60 is configured so that information different from that indicated in the main display region including the first and second display regions 81 and 82 is indicated as the supplementary information 135 in the third display region 83. According to the present embodiment, referring to FIGS. 3 and 4, the display control unit 60 is configured so that a prime mover rotary speed detected by the rotary speed detection unit 70 is indicated as one kind of supplementary information 135 leftward from the third display region 83 serving as the auxiliary display region, while a total operation time in the name of "Minute, Hour" calculated by the time calculation unit 75 is indicated rightward from the indicated prime mover rotary speed. The only requirement for the content indicated as the supplementary informant 135 is that it is different from the content displayed in the main display region including the first and second display regions 81 and 82. Therefore, the supplementary information 135 is not limited to the prime mover rotary speed and the total operation time.

Figure 5:
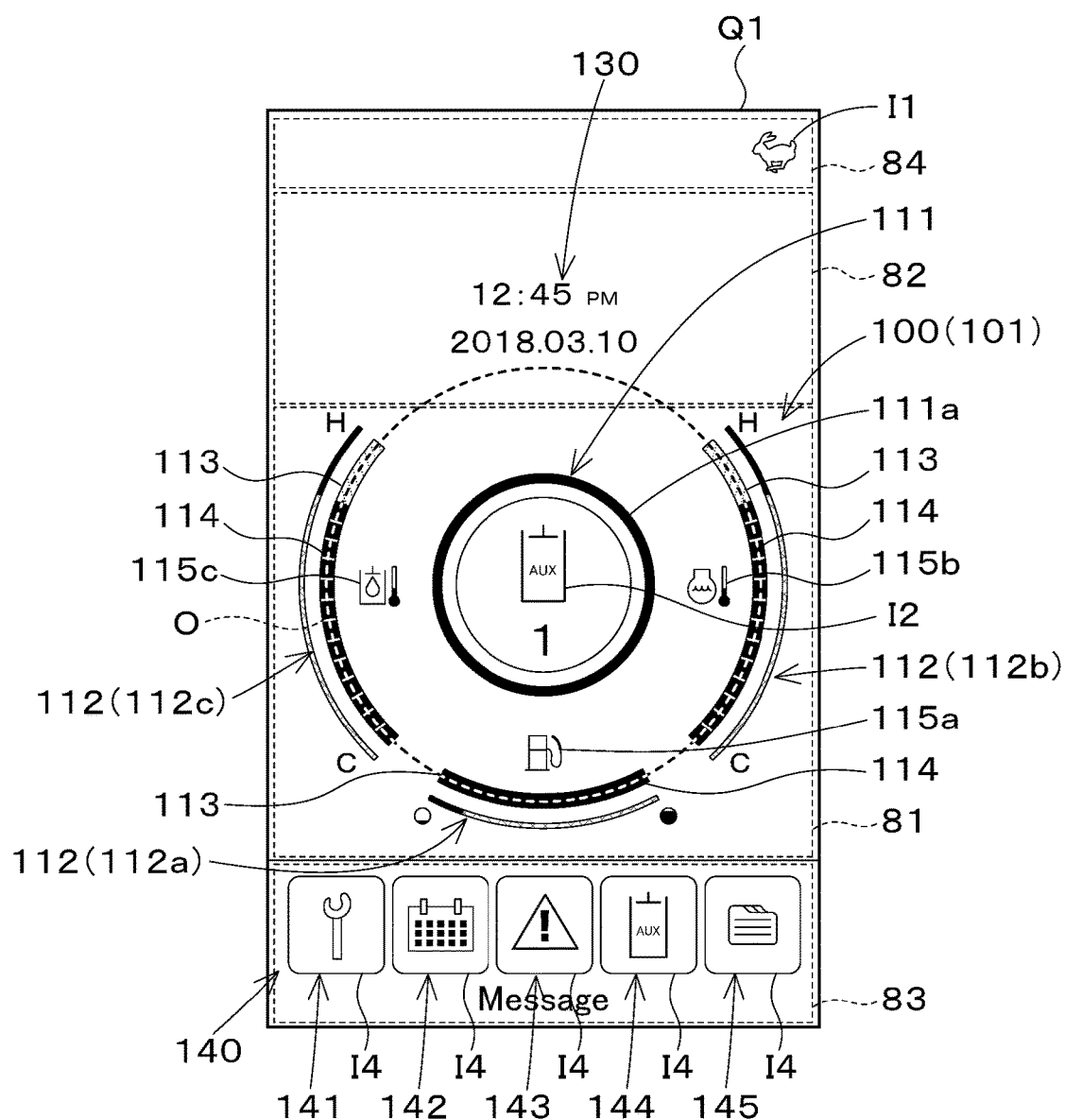
FIG. 5 illustrates an example of the display screen displaying a menu image in the first display state.
Figure 6:
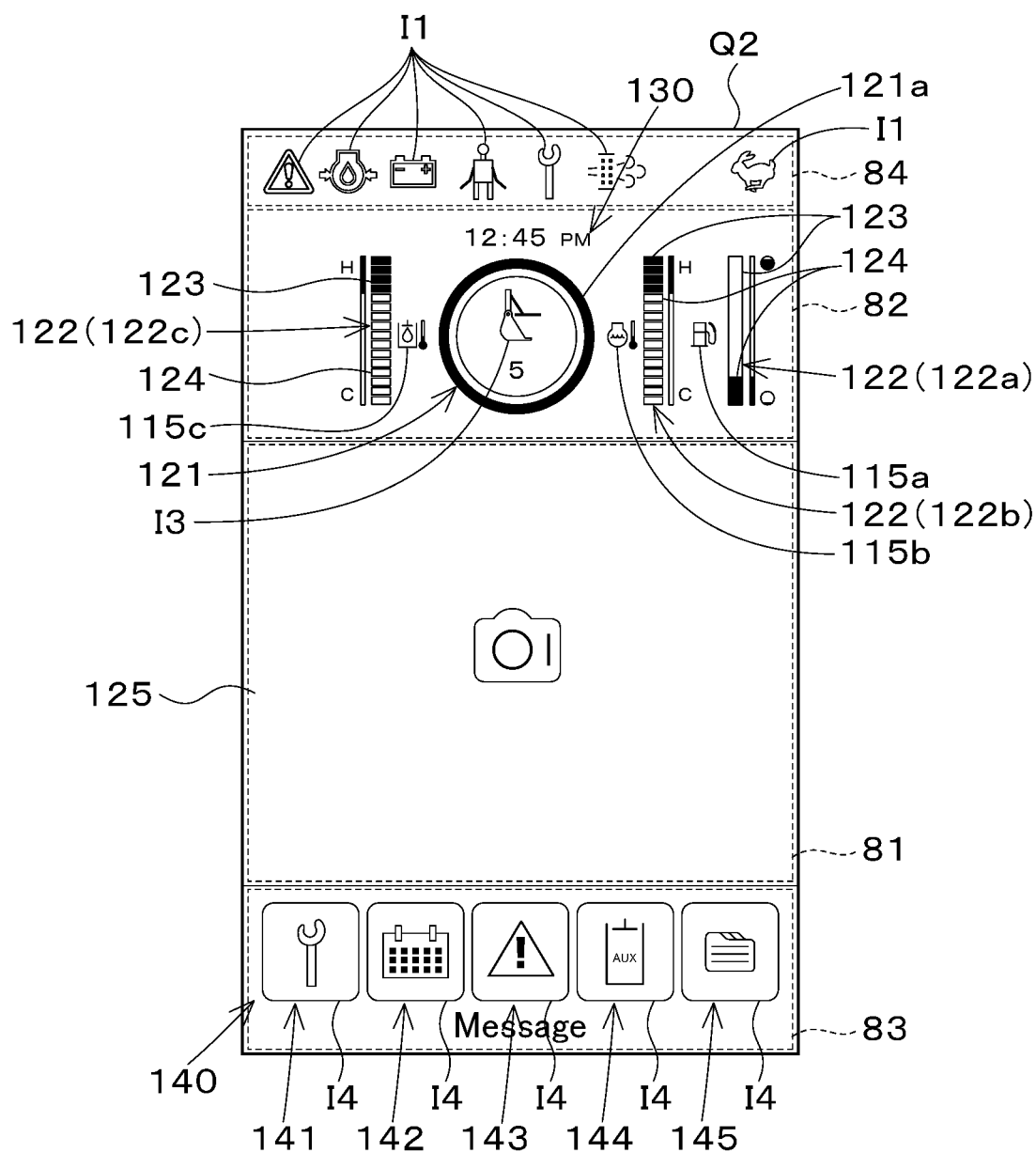
FIG. 6 illustrates an example of the display screen displaying a menu image in the second display state.

Referring to FIGS. 5 and 6, the display control unit 60 commands the display 57 to display a menu image 140 on a portion of the display screen 58. The menu image 140 can indicate a menu including a plurality of items regarding settings of the working machine 1, e.g., a list of functions to be set, so that an operator can optionally select one of the indicated items. The display control unit 60 is configured so that, when a predetermined menu displaying operation is performed, the menu image 140 is displayed on the portion of the display screen 58. The menu displaying operation means depression of the menu switch 65, for example. Referring to FIGS. 3 and 4, when the display control unit 60 commands the display 57 to indicate the supplementary information 135 in either the first display state displaying the operation screen Q1 or the second display state displaying the photographed image screen Q2 and the menu switch 65 is depressed, the display control unit 60 commands that the menu image 140 is displayed linearly along the outer peripheral edge portion of the display screen 58. More specifically, the menu image 140 is displayed in the third display region 83 as extending linearly in the lateral direction of the display screen 58. The display control unit 60 is configured so that the menu image 140 is displayed at a portion where the supplementary information 135 has been indicated, thereby partly concealing the work indicating image 100.

Specifically, when the menu displaying operation is performed, the display control unit 60 is configured so that the menu image 140 slides on the display screen 58 inward from an outer peripheral edge portion of the display screen 58 so as to gradually expand its occupancy area. More specifically, the display control unit 60 is configured so that, when the menu switch 65 is depressed, the menu image 140 slides upward from a bottom edge portion of the display screen 58 so as to gradually expand its occupancy area. In other words, the menu image 140 is displayed as sliding upward from the bottom edge portion of the display screen 58 so as to appear over the supplementary information 135, i.e., so as to conceal the supplementary information 135.

In the normal display state, the display control unit 60 is configured to display the menu image 140 as a layer higher than the supplementary information 135. According to the present embodiment, when the menu displaying operation is performed, the display control unit 60 is configured so that the menu image 140 is displayed to replace the whole supplementary information 135. However, the menu image 140 may not range over the whole supplementary information 135. The display control unit 60 may be configured so that the menu image 140 is displayed to replace a part of the supplementary information 135.

Referring to FIGS. 5 and 6, the display control unit 60 is configured so that the plurality of items indicated by the menu image 140 are displayed as icons. When one of the items indicated by respective icons 14 in the menu image 140 is selected, the display control unit 60 commands to transition the display state on the display screen 58 from the current first or second display state where the operation screen Q1 or photographed image screen Q2 is displayed to a state where one kind of setting screen Q3 corresponding to the selected item is displayed.

The setting screen Q3 is provided for settings of the working device 4. For example, an inspection screen, an operation managing screen, a warning confirmation screen, an attachment setting screen, a detailed setting screen and so on serve as kinds of setting screens Q3. The inspection screen is used for periodic inspection. The operation managing screen is used for operation management. The warning confirmation screen is used for confirming a warning. The attachment setting screen is used for settings of the attachment 17. The detailed setting screen is used for detailed settings of the display 57 or so on. In summary, the menu image 140 indicates a menu regarding the periodical inspection, operation management, warning confirmation, working device setting, and detailed settings. Specifically, the display control unit 60 commands that the menu image 140 indicates an inspection icon 141, a management icon 142, a confirmation icon 143, an attachment icon 144 and a setting icon 145, which mean respective items associated with the respective kinds of setting screens Q3.

Referring to FIGS. 5 and 6, according to the present embodiment, the display control unit 60 is configured to display the inspection icon 141, management icon 142, confirmation icon 143, attachment icon 144 and setting icon 145 as being juxtaposed in the lateral direction in this order when the menu image 140 is viewed from its left end to its right end. The display control unit 60 is configured so that one of the items, i.e., icons 14, in the menu image 140 is displayed as a candidate distinguishingly from the other items. More specifically, when the rotary operation member 64a is operated, the display control unit 60 commands that one of the icons 14 is color-changed to serve as the candidate.

The display control unit 60 is configured to transition the candidate icon 14 according to the rotational operation of the rotary operation member 64a. For example, when the rotary operation member 64a is rotated clockwise, the display control unit 60 commands that the neighboring icon 14 on the right side of the icon 14 indicated as the last candidate is color-changed to be indicated as a new candidate, thereby transitioning the candidate item. On the other hand, when the rotary operation member 64a is rotated counterclockwise, the display control unit 60 commands that the neighboring icon 14 on the left side of the icon 14 indicated as the last candidate is color-changed to be indicated as a new candidate, thereby transitioning the candidate item. In this regard, when the rightmost icon 14 serves as the present candidate and the rotary operation member 64a is rotated clockwise, the leftmost icon 14 is color-changed to be indicated as a new candidate, thereby transitioning the candidate item from the rightmost icon 14 to the leftmost icon 14. When the leftmost icon 14 serves as the present candidate and the rotary operation member 64a is rotated counterclockwise, the rightmost icon 14 is color-changed to be indicated as a new candidate, thereby transitioning the candidate item from the leftmost icon 14 to the rightmost icon 14.

When the pressing operation member 64b is depressed, the display control unit 60 determines the item having been indicated as a candidate to become a selected item and commands the display 57 to display the kind of setting screen Q3 corresponding to the item determined as the selected item. For example, when the icon 14 serving as the confirmation icon 143 is indicated as a candidate and the pressing operation member 64b is depressed, the icon 14 serving as the confirmation icon 143 is determined to become a selected item, and the display control unit 60 commands that the warning confirmation screen serving as one kind of the setting screen Q3 is displayed on the display screen 58. Hereinafter, for convenience of description, the warning confirmation screen may be referred to as a list display screen Q5.

When the operation to select one of the icons 14 in the menu image 140 is performed, the display control unit 60 commands so that the setting screen Q3 is displayed as sliding upward from the bottom edge portion of the display screen 58. The display control unit 60 is configured so that the setting screen Q3 is displayed so as to conceal the work indicating images 100, thereby transitioning the displayed screen from either the operation screen Q1 or photographed image screen Q2 to the setting screen Q3. According to the present embodiment, the setting screen Q3 covers the first display region 81 including the work indicating images 100, the second display region 82 and the third display region 83, thereby concealing the work indicating screen 100. The only requirement for the setting screen Q3 is to partly or fully conceal the work indicating images 100. Therefore, the setting screen Q3 may conceal only the first display region 81.

If the menu image 140 is left with no operation applied thereon for a predetermined period of time, e.g., three seconds, the display control unit 60 commands so that the menu image 140 is no longer displayed. Therefore, the work indicating images 100 can be automatically displayed in the case where the menu image 140 displayed on the display screen 58 is left for the predetermined period of time because of an operator's leaving the working machine 1 or another reason. According to the present embodiment, when the menu image 140 is displayed and a predetermined operation to cancel the display of the menu image 140, e.g., operation of the return switch 66 or menu switch 65, or pressing of a return button displayed by the display 57, the display control unit 60 commands so that the menu image 140 is no longer displayed. The display control unit 60 is configured so that the menu image 140 slides outward to the peripheral edge portion of the display screen 58 until it deviates from the display screen 58. More specifically, the display control unit 60 is configured so that the menu image 140 slides downwardly outward on the display screen 58 to deviate from the display screen 58.

The display control unit 60 is configured to redisplay the supplementary image 135 in the third display region 83 after the menu image 140 is no longer displayed.

Figure 7A:
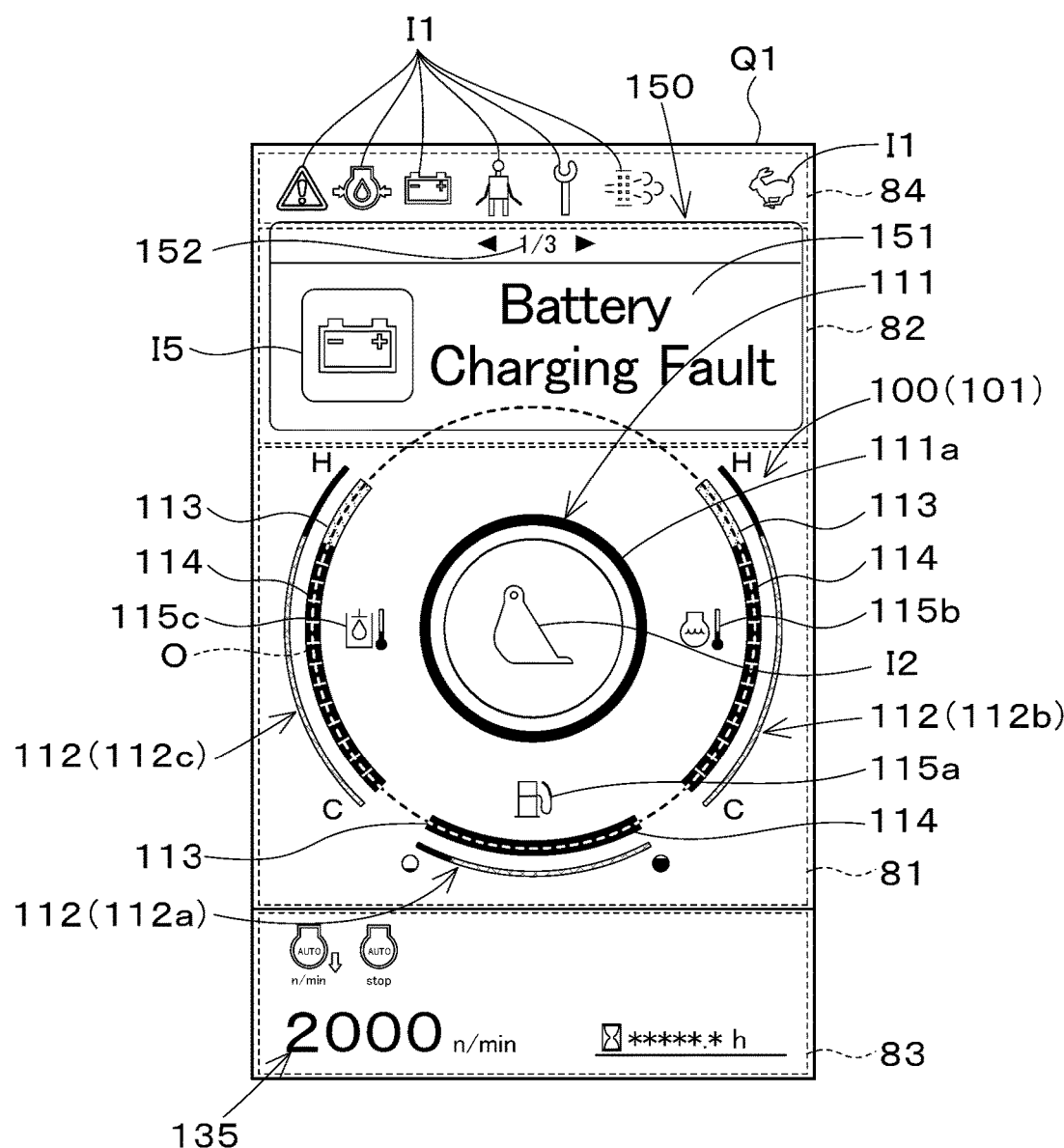
FIG. 7A illustrates an example of the display screen displaying a warning indicating image in the first display state.
Figure 7B:
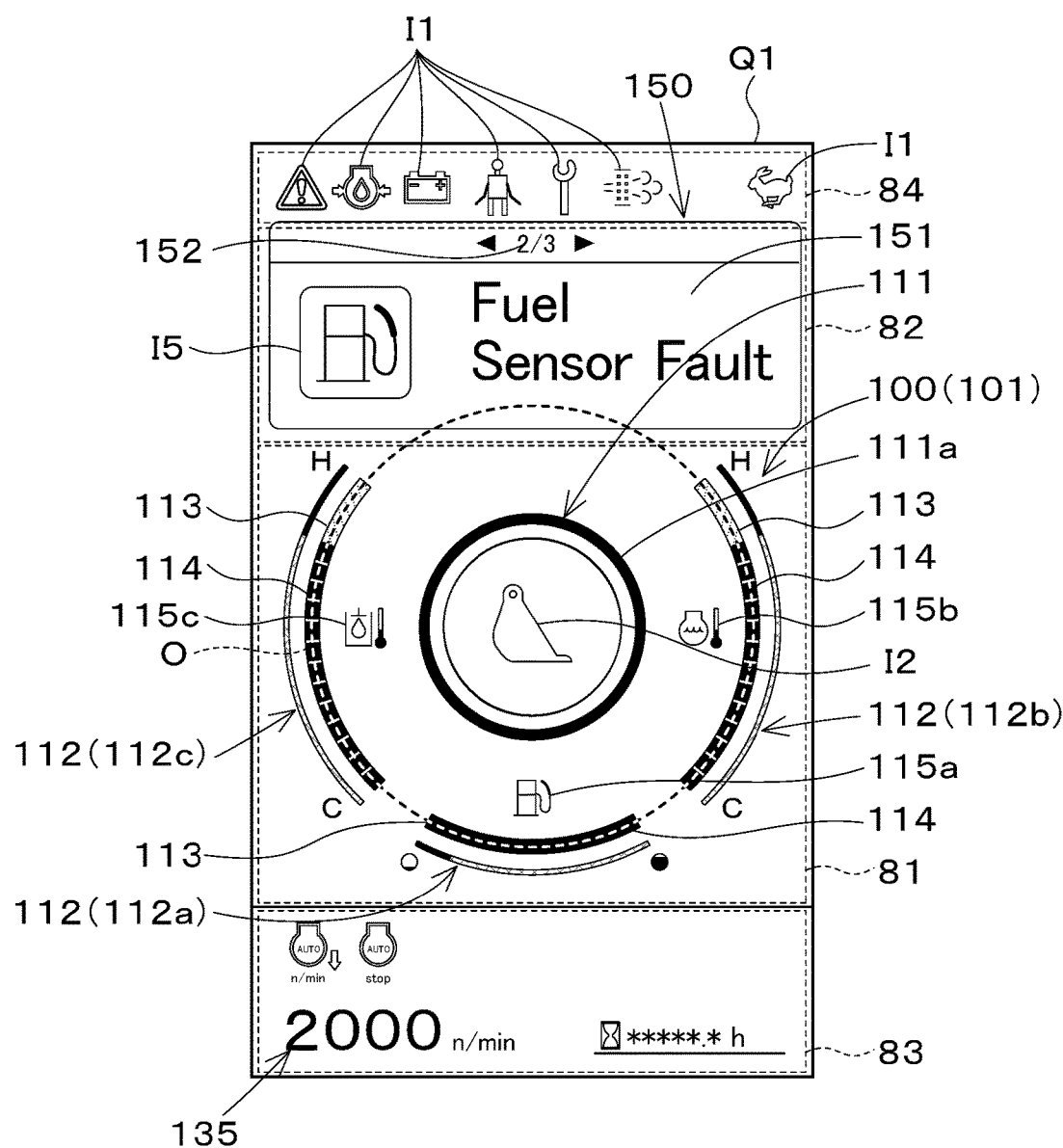
FIG. 7B illustrates another example of the display screen displaying a warning indicating image in the first display state.
Figure 8:
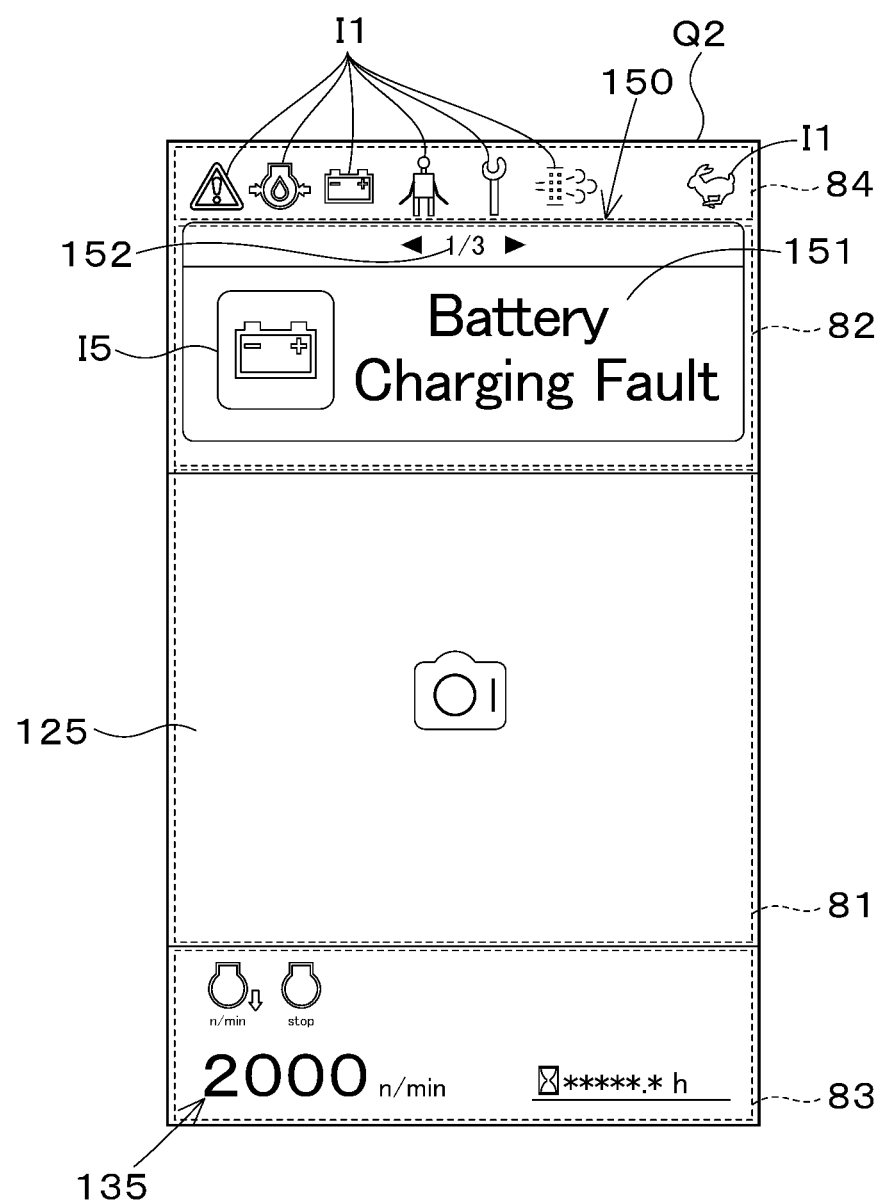
FIG. 8 illustrates an example of the display screen displaying a warning indicating image in the second display state.

Referring to FIGS. 7A, 7B and 8, the display control unit 60 can command the display 57 to indicate, on the display screen 58, warning information corresponding to a warning condition detected by the anomaly detection unit 74. When a warning condition, i.e., a warning event, occurs in the normal display state, the display control unit 60 commands so that the image displayed in the second display region 82 before the occurrence of the warning event is replaced with the warning information newly indicated in the second display region 82. If the anomaly detection unit 74 detects a plurality of warning conditions, i.e., if a plurality of warning events occur, the display control unit 60 commands so that a piece of warning information corresponding to one of the plurality of warning conditions is displayed in the second display region 82.

Referring to FIGS. 7A, 7B and 8, in the normal display state, the display control unit 60 commands so that a warning indicating image 150 is displayed to indicate the warning information. The warning indicating image 150 includes a warning icon IS and a warning name 151. The warning icon IS is a simplified figure associated with the content of warning information. The warning icon IS is arranged in a left portion of the warning indicating image 150. The kinds of warning information are previously classified by importance levels of the respective kinds of warning conditions. Different colors corresponding to the respective importance levels are prepared for backgrounds of the respective warning icons IS, and the display control unit 60 commands that the warning icon IS is displayed with its background in color corresponding to the importance level of the warning information indicated by the warning icon IS. The background colors of the respective warning icons IS have respective hues corresponding to their importance levels and the hues have predetermined differences therebetween. More specifically, in the case where the importance level of warning information to be indicated is high, the display control unit 60 commands that the background of the warning icon 15 is displayed in red while the warning icon IS is displayed in black. On the other hand, in the case where the importance level of warning information to be indicated is low, the display control unit 60 commands that the background of the warning icon IS is displayed in yellow while the warning icon IS is displayed in white.

Referring to FIGS. 7A, 7B and 8, the display control unit 60 is configured to adopt an item name of the warning information as the warning name 151 to be indicated. The warning name 151 is arranged adjacently on the right side of the warning icon IS. For example, when the anomaly detection unit 74 detects that the voltage of the battery is not more than a predetermined value, the display control unit 60 commands so that an item name "Battery Charging Fault" is adopted as the warning name 151 indicated in the warning indicating image 150. When the anomaly detection unit 74 detects an anomaly in the fuel supply system, e.g., a fault in the residual quantity detection unit 71, the display control unit 60 commands so that an item name "Fuel Sensor Fault" is adopted as the warning name 151 to be indicated. The display control unit 60 may command that a warning ID number corresponding to the warning is indicated together with the warning name 151.

When the anomaly detection unit 74 detects a plurality of warning conditions, the display control unit 60 commands to indicate warning information in the second display region 82 with information for indicating the number of pieces of warning information corresponding to the presently occurring warning conditions. Specifically, the display control unit 60 commands so that one of respective pieces of warning information corresponding to the presently occurring warning conditions is indicated in the second display region 82 while information regarding the number of the pieces of warning information is indicated on the display screen 58. More specifically, the display control unit 60 commands so that a warnings count 152 which is the number of pieces of warning information corresponding to the presently occurring warning conditions is indicated in the second display region 82. The display control unit 60 commands so that the total number (e.g., the total of pages) of pieces of warning information and a warning number (e.g., a page number) are indicated as the warnings count 152. The warning numbers are ranged within the total number of pieces of warning information and are allotted to the respective pieces of warning information. The display control unit 60 commands that the warnings count 152 named "Warning Number/Total Number of Warnings" is displayed to indicate the warning number and the total number of pieces of warning information.

In the state where a plurality of warning conditions occur and one piece of warning information corresponding to one of the presently occurring warning conditions is indicated on the display screen 58, when an instruction to transition warning information indicated on the display screen 58 is given, the display control unit 60 commands to transition the display on the display screen 58 from the present state displaying the one piece of warning information to a new state displaying another piece of warning information. More specifically, in the state where a plurality of warning conditions occur and one piece of warning information corresponding to one of the warning conditions is indicated in the second display region 82, when the rotary operation member 64a serving as the display operation member 63 is rotated, an instruction to transition the indicated piece of warning information to another piece of warning information is given to the display control unit 60. According to the instruction, the display control unit 60 commands to transition the display on the display screen 58, thereby newly indicating another piece of warning information on the display screen 58. For example, FIG. 7A illustrates a state where the warning indicating image 150 is displayed to indicate a piece of warning information regarding the battery charging fault. In this state, when the rotary operation member 64a serving as the display operation member 63 is rotated, an instruction to transition the indicated warning information to another piece of warning information, e.g., the fuel sensor fault, is given to the display control unit 60. According to the instruction, the display control unit 60 commands that the warning information regarding the fuel sensor fault is newly displayed on the display screen 58 as shown in FIG. 7B. More specifically, one icon and one name indicating the fuel sensor fault are adopted as the warning icon IS and the warning name 151 in the warning indicating image 150 so that the warning indicating image 150 comes to indicate the fuel sensor fault as the newly indicated warning information after the transition of warning information. A set of numeral and sign "⅔" is adopted as the warnings count 152 indicating that the fuel sensor fault is the second warning of all the warnings.

As mentioned above, when the rotary operation member 64a is rotated clockwise, the display control unit 60 commands so that the warning information indicated in the second display region 82 is transitioned from one piece of warning information to another first following piece of warning information assigned with one greater warning number. On the other hand, when the rotary operation member 64a is rotated counterclockwise, the display control unit 60 commands so that the warning information indicated in the second display region 82 from one piece of warning information to another first preceding piece of warning information assigned with one less warning number. When the first piece of warning information assigned with the warning number 1 is indicated and the rotary operation member 64a is rotated counterclockwise, the display control unit 60 commands so that the indicated waring information is transitioned from the first piece of warning information to the final piece of warning information assigned with the maximum warning number. On the other hand, when the final piece of warning information assigned with the maximum warning number is indicated and the rotary operation member 64a is rotated clockwise, the display control unit 60 commands so that the indicated waring information is transitioned from the final piece of warning information to the first piece of warning information assigned with the warning number 1. Even if the rotary operation member 64a is not operated, the display control unit 60 may command to transition the indicated warning information every time when a predetermined time has elapsed. In this case, when the predetermined time has elapsed since the start of indicating one piece of warning information, the display control unit 60 commands so that the indicated piece of warning information is transitioned to another first following piece of warning information assigned with one greater warning number. When the predetermined time has elapsed since the start of indicating the final piece of warning information assigned with the maximum warning number, the display control unit 60 commands so that the indicated warning information is transitioned from the final piece of warning information to the first piece of warning information assigned with the warning number 1. By depressing the pressing operation member 64b, the display control unit 60 can command to select one piece of warning information presently indicated by the warning indicating image 150 displayed in the second display region 82 of the display screen 58.

Figure 9:
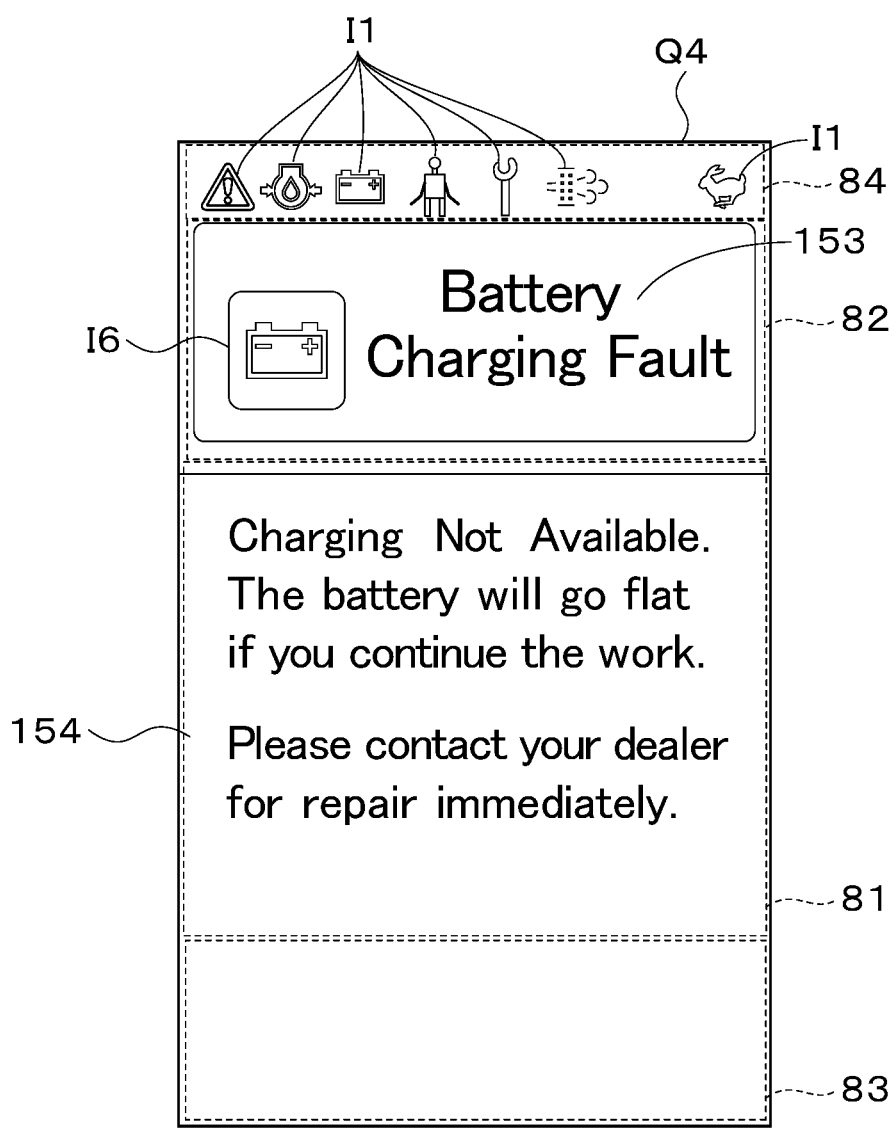
FIG. 9 illustrates an example of the display screen indicating first detailed information.

Referring to FIG. 9, in the normal display state, when the operation to select the piece of warning information indicated in the second display region 82, the display control unit 60 can command to display a first warning detail screen Q4 indicating a piece of first detailed information 154 regarding the selected piece of warning information. The display control unit 60 is configured to display and indicate, on the first warning detail screen Q4, a warning icon 16, a warning name 153 and one piece of first detailed information 154. The display control unit 60 is configured so that the warning icon 16 and warning name 153 on the first warning detail screen Q4 are identical to those in the warning indicating image 150. In this regard, the warning icon 16 and warning name 153 are displayed in the second display region 82. More specifically, the warning icon 16 is arranged in the left portion of the second display region 82, and the warning name 153 is arranged rightward from the warning icon 16. The piece of first detailed informant 154 is indicated in a detail display region including the first display region 81. According to the present embodiment, the detail display region in which the piece of first detailed information 154 is indicated includes the first display region 81 and third display region 83. However, the detail display region is not limited to that configured as mentioned above because the only requirement for the detail display region is to include at least the first display region 81. Therefore, the detail display region may include the first display region 81 and second display region 82.

Each piece of first detailed information 154 has a volume such that it fits in one page of the detail display region, e.g., the first and third display regions 81 and 83. Each piece of first detailed information 154 is indicated mainly to deepen the operator's understanding. For example, when the indicated piece of warning information is the battery charging fault, the corresponding piece of first detailed information 154 to be indicated is that of the kind purposed for informing the operator of the warning content and for urging the operator to request a dealer or supplier of repairment.

When a plurality of warning conditions occur and an instruction to transition the piece of first detailed information 154 indicated on the display screen 58 is given, the display control unit 60 commands that the presently indicated piece of first detailed information 154 is transitioned to another piece of first detailed information 154 which is newly indicated. More specifically, when a plurality of warning conditions occur and one piece of first detailed information 154 corresponding to one of the occurring warning conditions is indicated in the detail display region, by rotating the rotary operation member 64a serving as the display operation member 63, an instruction to transition the piece of first detailed information 154 is given to the display control unit 60. According to the instruction, the display control unit 60 is configured to transition the first detailed information 154 indicated in the detail display region from the one piece to another piece.

Figure 10:
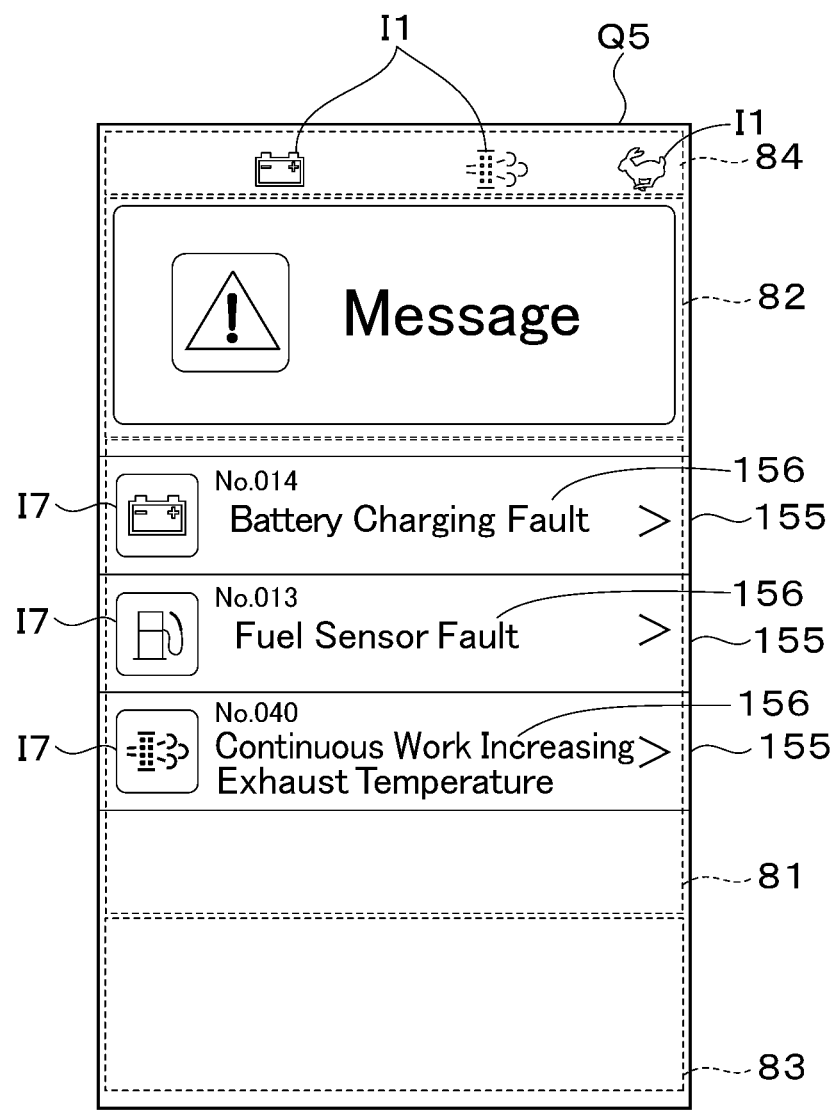
FIG. 10 illustrates an example of the display screen displaying a list of pieces of warning information.

When a plurality of warning conditions occur and a transition instruction is given to transition the indicated warning information to a list of pieces of warning information corresponding to the respective warning conditions, the display control unit 60 commands the display 57 to display a list display screen Q5 indicating the list of pieces of warning information on the display screen 58 as shown in FIG. 10. More specifically, when the display 57 displays the menu image 140 and an operator operates the rotary operation member 64a and the pressing operation member 64b to select the confirmation icon 143 in the menu image 140, the instruction to transition the indication of warning information from the piece of warning information to the list of pieces of warning information corresponding to the occurring warning conditions.

Referring to FIG. 10, the list display screen Q5 includes a plurality of warning blocks 155 indicating the respective pieces of warning information. Referring to FIG. 10, the warning blocks are displayed in a region including the first display region 81 and third display region 83. Each warning block 155 displays a warning icon 17 and a warning name 156 therein. The warning icon 17 and warning name 156 displayed in each warning block 155 are identical to those displayed in the warning display image 150 in the normal display state. One of the warning blocks 155 on the list display screen Q5 can be selected by operating the rotary operation member 64*a*. More specifically, by rotating the rotary operation member 64*a* clockwise, the selected warning block 155 can be shifted to another arranged therebelow. On the other hand, by rotating the rotary operation member 64*a* counterclockwise, the selected warning block 155 can be shifted to another arranged thereabove. The display control unit 60 is configured so that the background in the selected warning block 155 is displayed in color different from that of any other warning block 155. If many warning conditions are detected and some of the warning blocks 155 indicating the pieces of warning information corresponding to the respective warning conditions deviate from the first and third display regions 81 and 83, the deviating warning blocks 155 can be scrolled to be displayed. By pressing the pressing operation member 64*b* after the operation of the rotary operation member 64*a* to select one of the warning blocks 155, the piece of warning information indicated by the selected waning block 155 can be confirmingly selected.

When the operation to select any one of the pieces of warning information indicated by the respective warning blocks 155 displayed in the first and third display regions 81 and 83 is applied on the list display screen Q5, the display control unit 60 commands the display 57 to display a second warning detail screen Q6 on the display screen 58 as shown in FIG. 11. The second warning detail screen Q6 indicates one piece of second detailed information 159 corresponding to the selected piece of warning information in the detail display region.

Referring to FIG. 11, the display control unit 60 commands that a warning icon 18, a warning name 157, a warnings count 158, one piece of second detailed information 159 and a confirmation button 160 are displayed on the second warning detail screen Q6. The warning icon 18, warning name 157 and warnings count 158 displayed on the second warning detail screen Q6 are identical to those indicating the selected piece of warning information in the warning indicating image 150. The warning icon 18 is arranged in a left portion of the second display region 82, and the warning name 157 and warnings count 158 are arranged rightward from the warning icon 18. Each piece of second detailed information 159 is indicated in the detail display region including the first display region 81. According to the present embodiment, the detail display region for indicating the piece of second detailed information 159 includes the first display region 81. The detail display region may include the first display region 81 and second display region 82 because the only requirement for the detail display region is to include at least the first display region 81.

The pieces of second detailed information 159 are more detailed than the pieces of first detailed information 154. In the case where both the piece of first detailed information 154 and the piece of second detailed information 159 correspond to the common warning condition, the piece of second detailed information 159 has a greater volume than that of the piece of first detailed informant 154. Specifically, for example, the display control unit 60 is configured so that an error code corresponding to the warning content, an image indicating an anomaly position corresponding to the warning, and so on are displayed to serve as the indicated piece of second detailed information 159. If the indicated piece of second detailed information 159 has a great volume such as to exceed that fitting in one page of the detail display region, e.g., the first display region 81, the whole piece of the second information 159 can be indicated in the detail display region by scrolling or paging. More specifically, if the indicated piece of second detailed information 159 includes many sentences having a great volume such as to exceed that fitting in one page of the detail display region, by operating the rotary operation member 64*a*, the display control unit 60 can command to prepare the piece of second detailed information 159 to be indicated in the detail display region so that the whole content of the second detailed information 159 can be indicated in the detail display region by scrolling or paging operation. According to the present embodiment, the paging or scrolling operation means the rotational operation of the rotary operation member 64*a*. However, this is not restrictive. The paging or scrolling operation may be performed by operating an operation member other than the rotary operation member 64*a*.

The confirmation button 160, when selected by operating the rotary operation member 64*a*, gives the display control unit 60 an instruction to display the list display screen Q5 on the display screen 58. For example, on the second warning detail screen Q6, the confirmation button 160 is displayed in the third display region 83. The confirmation button 160 is optional so that it may be omitted.

Figure 12:
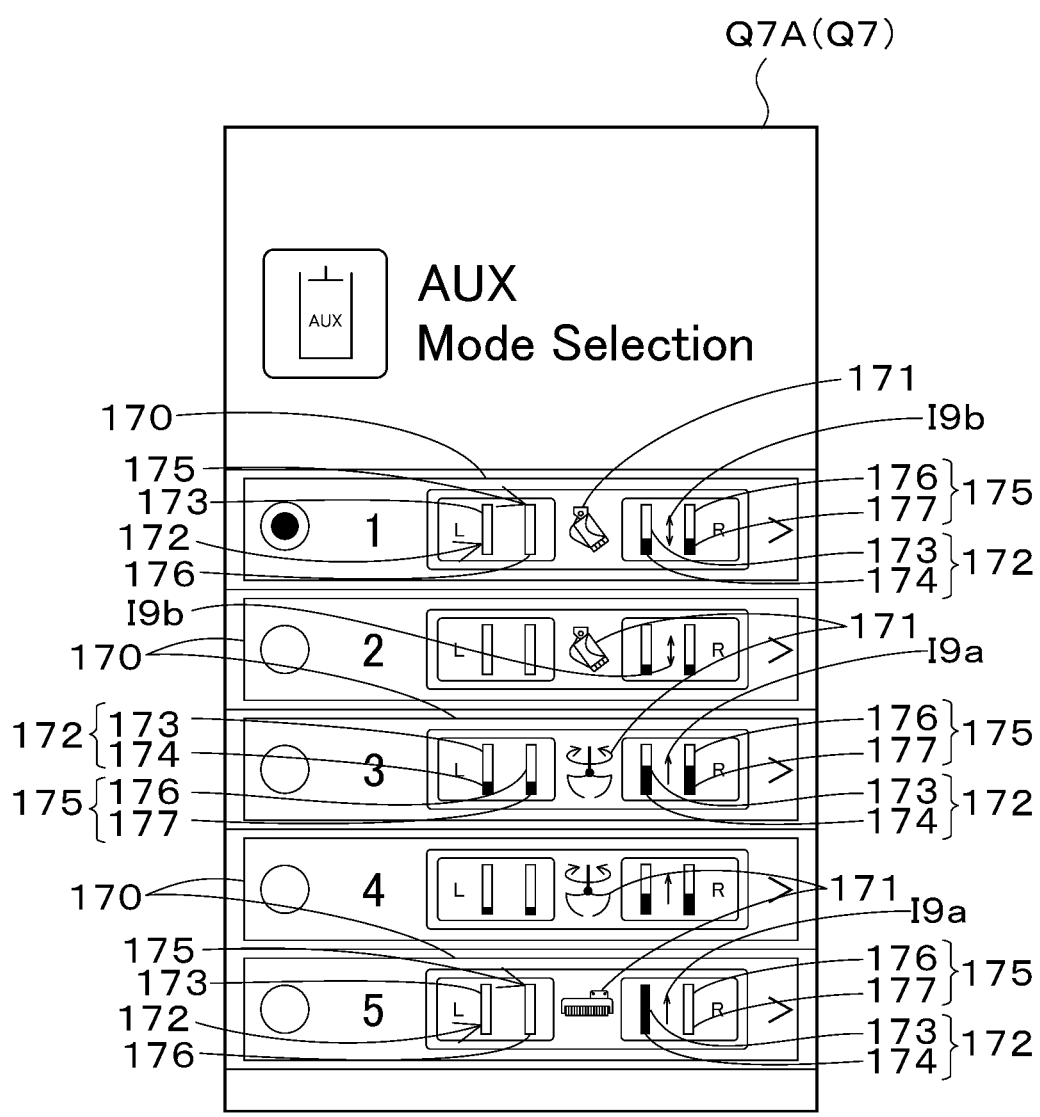
FIG. 12 illustrates an example of the display screen displaying a list screen serving as a flow rate selection screen.
Figure 13:
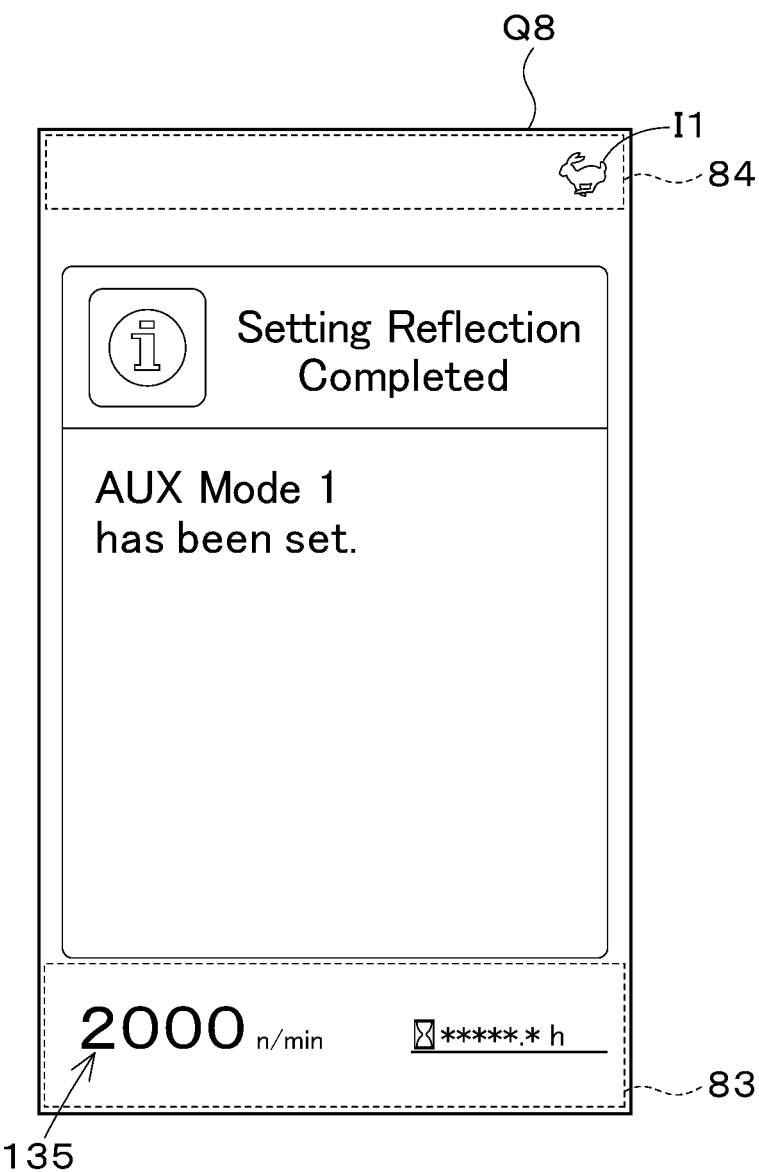
FIG. 13 illustrates an example of the display screen displaying a setting completion screen.
Figure 14:
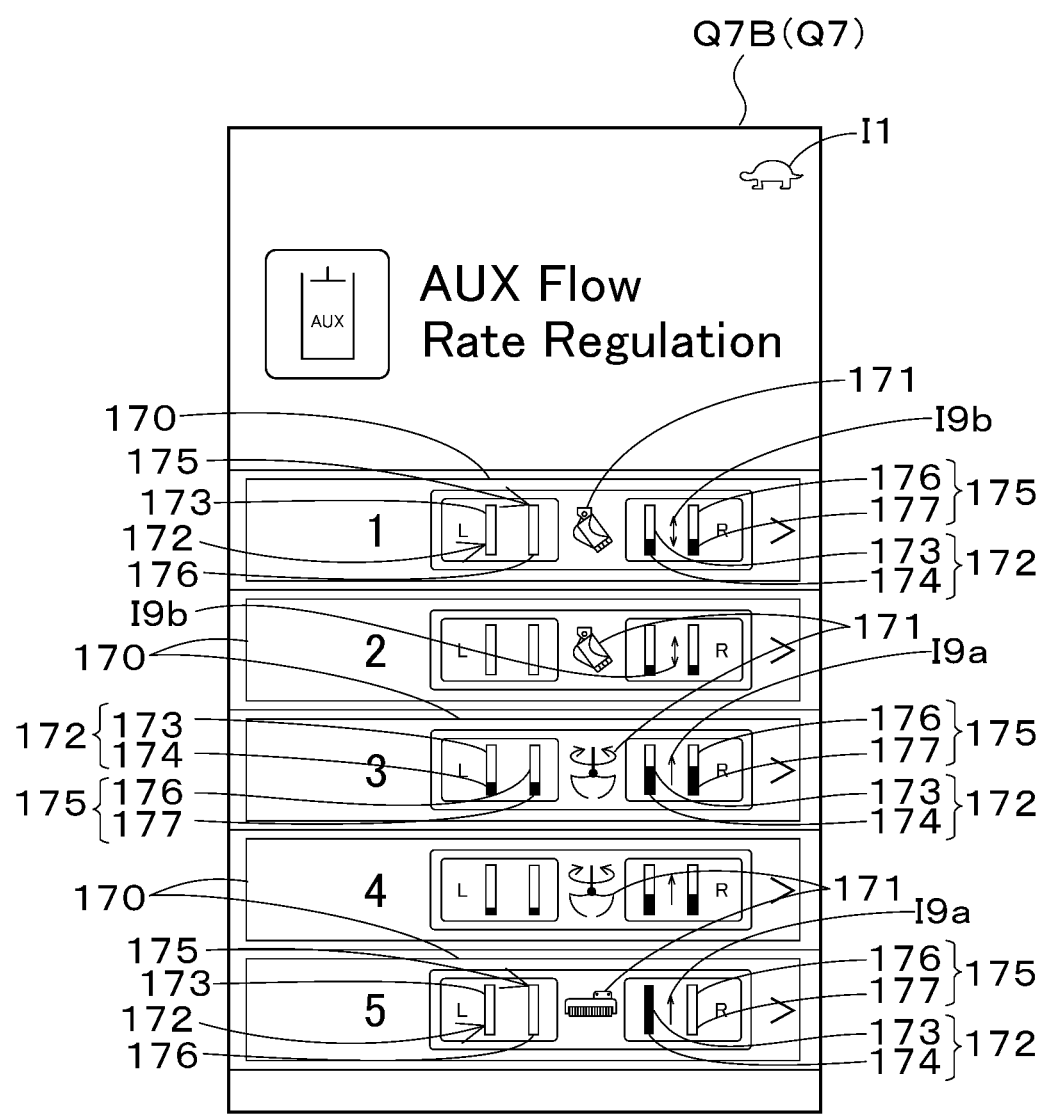
FIG. 14 illustrates an example of the display screen displaying a list screen serving as a target selection screen.

Referring to FIGS. 12 and 14, the display control unit 60 can command the display 57 to display a list screen Q7. The list screen Q7 indicates the plurality of kinds of attachments 17 available to be attached to the working machine 1 and the setting contents of maximum flow rate levels corresponding to the respective kinds of attachments 17. The display control unit 60 is configured to indicate each setting content of the maximum flow rate level in correspondence to each kind of attachments 17, each of the slide switches 20L and 20R, and each of the operation directions for operating each slide switch 20L or 20R.

More specifically, the display control unit 60 commands that option regions 170 indicating the respective kinds of optional attachments 17 capable of being attached to the working machine 1 are displayed on the list screen Q7, each of the option regions 170 being displayed with first to fourth supply flow rates suitable to the corresponding kind of attachment 17.

In each of the option regions 170, an icon image 171 indicating the corresponding kind of attachment 17 available to be attached to the working machine 1, a first flow rate image 172 indicating the first and third supply flow rates corresponding to the kind of attachment 17 indicated by the icon image 171, and a second flow rate image 173 indicating the second and fourth flow rates corresponding to the kind of attachment 17 indicated by the icon image 171. The icon image 171 indicates a figure expressing a simplified appearance of the corresponding attachment 17, which is identical or similar to that of the icon 12 displayed in the icon image 111 or so on. The icon images 171 are stored in the storage unit 61. In summary, the display control unit 60 reads the icon images 171 from the storage unit 61 and commands that the icon images 171 are displayed in the respective option regions 170. According to the present embodiment, a kind of attachment 17 movable in the four directions by means of the two flow rate control valves, i.e., the first flow rate control valve 33D and second flow rate control valve 33E is considered as the most complicatedly movable attachment 17. Therefore, in each option region 170, one set of first and second flow rate images 172 and 175 corresponding to the first flow rate control valve 33D and another set of first and second flow rate images 172 and 175 corresponding to the second flow rate control valve 33E are prepared. The first flow rate image 172 corresponding to the first flow rate control valve 33D indicates the first supply flow rate, and the second flow rate image 175 corresponding to the first flow rate control valve 33D indicates the second supply flow rate.

The first flow rate image 172 corresponding to the second flow rate control valve 33E indicates the third supply flow rate, and the second flow rate image 175 corresponding to the second flow rate control valve 33E indicates the fourth supply flow rate. The one set of first and second flow rate images 172 and 175 are arranged and displayed on one of the left and right sides, e.g., the left side, of the icon 17 and the other set of first and second flow rate images 172 and 175 are arranged and displayed on the other of the left and right sides, e.g., the right side, of the icon 17.

In each option region 170, the first flow rate image 172 arranged leftward from the icon image 171 indicates the first supply flow rate to be set for operating the first slide switch 20L in the first operation direction serving as one of its operation directions, and the first flow rate image 172 arranged rightward from the icon image 171 indicates the third supply flow rate to be set for operating the second slide switch 20R in the third operation direction serving as one of its operation directions.

In each option region 170, the second flow rate image 175 arranged leftward from the icon image 171 indicates the second supply flow rate to be set for operating the first slide switch 20L in the second operation direction serving as the other of its operation directions, and the second flow rate image 175 arranged rightward from the icon image 171 indicates the fourth supply flow rate to be set for operating the second slide switch 20R in the fourth operation direction serving as the other of its operation directions. In other words, the display control unit 60 commands to indicate the maximum flow rate levels corresponding to the respective first to fourth operation directions.

As mentioned above, the display control unit 60 is configured to display four indicators in each option region 170. The four indicators consist of the one set of first and second flow rate images 172 and 175 indicating the flow rates of hydraulic fluid outputted from the first flow rate control valve 33D and the other set of first and second flow rate images 172 and 175 indicating the flow rates of hydraulic fluid outputted from the second flow rate control valve 33E. According to the present embodiment, the display control unit 60 commands to display the four indicators in each option region. However, the number of indicators displayed in each option region 170 according to the command from the display control unit 60 may be variable depending on the number of control valves 33. For example, if there are three control valves 33 for setting flow rates of hydraulic fluid by means of the flow rate setting unit 76, the display control unit 60 commands that six indicators are displayed in each option region 170.

Each first flow rate image 172 includes a first flow rate scale 173 indicating a scale of the maximum flow rate level and a first flow rate index 174 indicating the maximum flow rate level in association with the first flow rate scale 173. The display control unit 60 is configured so that the first flow rate index 174 is displayed as being extendable and contractable vertically along the first flow rate scale 173 in correspondence to the maximum flow rate level set by means of the flow rate setting unit 76.

Each second flow rate image 175 includes a second flow rate scale 176 indicating a scale of the maximum flow rate level and a second flow rate index 177 indicating the maximum flow rate level in association with the second flow rate scale 176. The display control unit 60 commands that the second flow rate index 177 is displayed as being extendable and contractable vertically along the second flow rate scale 176 in correspondence to the maximum flow rate level set by means of the flow rate setting unit 76.

Referring to FIG. 12, depending on whether the supply/discharge flow of hydraulic fluid corresponding to the kind of selected attachment 17 is unidirectional or bidirectional, the display control unit 60 commands so that either a unidirectional (or one-way) image I9a or a bidirectional (or two-way) image I9b is selectively displayed adjacently to the first or second flow rate image 172 or 175 (e.g., between the first and second flow rate images 172 and 175) corresponding to the slide switch 20L or 20R required for operating the selected attachment 17. The unidirectional image I9a indicates that the supply/discharge flow of hydraulic fluid is unidirectional. The bidirectional image I9b indicates that the supply/discharge flow of hydraulic fluid is bidirectional.

For example, when the switching valve 50 is shifted to the first position 50a to discharge hydraulic fluid from the attachment 17 to the hydraulic fluid tank T via the second flow rate control valve 33E, the display control unit 60 commands to display the bidirectional image I9b. On the other hand, when the switching valve 50 is shifted to the second position 50b to discharge hydraulic fluid from the attachment 17 to the hydraulic fluid tank T bypassing the second flow rate control valve 33E, the display control unit 60 commands to display the unidirectional image I9a. Incidentally, when the switching valve 50 is shifted to the second position 50b and hydraulic fluid is discharged from the attachment 17 to the hydraulic fluid tank T bypassing the second flow control valve 33E, the amount of hydraulic fluid supplied to a port of the attachment 17 from which hydraulic fluid is discharged becomes zero necessarily. Therefore, the display control unit 60 may command that the second flow rate image 175 corresponding to the second flow rate control valve 33E is automatically displayed to indicate the flow rate of zero, thereby reducing the operator's operation with the display 57 so as to improve the efficiency of work based on operation of the working machine 1.

According to the present embodiment, two kinds of list screens Q7 consisting of a flow rate selection screen Q7A as shown in FIG. 12 and a target selection screen Q7B as shown in FIG. 14 are prepared.

The flow rate selection screen Q7A is operable for selecting a setting content which is to be set by the flow rate setting unit 76 and which is previously stored in the machine storage unit 56. The control unit 55 controls the fluid rate of hydraulic fluid supplied from the control valves 33, i.e., the first and second flow rate control valves 33D and 33E, to the attachment 17 based on the first to fourth supply flow rates set in correspondence to the kind of attachment 17 selected by means of the flow rate selection screen Q7A serving as the list screen Q7. More specifically, an operator operates to rotate the rotary operation member 64a and to press the pressing operation member 64b, thereby selecting one of the option regions 170. When the operation is performed to select one of the option regions 170, a signal for informing that the one option region 170 has been selected is inputted from the display control unit 60 to the control unit 55. The control unit 55 controls the control valves 33 based on the signal and the setting content. Therefore, the operator can preview the list to decide which of the kinds of attachments 17 indicated on the list screen Q7 can be selected to appropriately control the control valves 33. Accordingly, the operator's operation errors can be reduced. Further, an operator needs not to operate to confirm the flow rate of hydraulic fluid set by means of the flow rate setting unit 76 every time when one of the available attachments 17 is selected, thereby improving the work efficiency.

On the other hand, the target selection screen Q7B is operable for selecting a setting content as a target to be changed (or a setting target) when the content of setting by means of the flow rate setting unit 76 stored in the machine storage unit 56 must be changed or regulated. In this regard, when an operation to select one of the option regions 170 is applied to the target selection screen Q7B serving as the list screen Q7, the display control unit 60 commands the display 57 to display the flow rate setting screen Q3 on the display screen 58. The flow rate setting screen Q3 is operable for changing the setting contents corresponding to the selected option region 170.

Referring to each of left and right figures in FIG. 15, the flow rate setting screen Q3 includes an attachment indicating image 180, flow rate setting images 181 and 184 and a confirmation button 187. The attachment indicating image 180 indicates the corresponding kind of attachment 17. More specifically, the attachment indicating image 180 indicates a figure expressing a simplified appearance of the attachment 17, identical or similar to the icon 12 displayed in the icon image 111 or so on.

The flow rate setting images 181 and 184 are operable for changing the setting contents of the maximum flow rate levels such as to correspond to the respective slide switches 20L and 20R and such as to correspond to the respective first to fourth operation directions for operating the slide switches 20L and 20R. The flow rate setting images 181 and 184 serve as indicators indicating the maximum flow levels set by means of the flow rate setting unit 76. When the maximum flow rate levels of hydraulic fluid corresponding to the kind of attachment 17 selected by the operation applied to the target selection screen Q7B need to be changed, the display control unit 60 commands the display 57 to display the flow rate setting images 181 and 184. The confirmation button 187 is operable for confirming the content displayed on the flow rate setting screen Q3 after the content is selected by operating the rotary operation member 64*a*.

The flow rate setting images 181 and 184 include the first input indicating image 181 and second input indicating image 184 corresponding to the first flow rate control valve 33D and the first input indicating image 181 and second input indicating image 184 corresponding to the second flow rate control valve 33E. The first input flow rate indicating image 181 and second input flow rate indicating image 184 corresponding to the first flow rate control valve 33D correspond to the first slide switch 20L. The first input flow rate indicating image 181 and second input flow rate indicating image 184 corresponding to the second flow rate control valve 33E correspond to the second slide switch 20R.

Referring to the left and right figures in FIG. 15, the first and second input indicating images 181 and 184 corresponding to the first slide switch 20L are arranged on one side (e.g., on the left side) of the attachment indicating image 180. The first input indicating image 181 corresponding to the first slide switch 20L indicates the maximum flow rate level corresponding to the first operation direction for operating the first slide switch 20L. The second input indicating image 184 corresponding to the first slide switch 20L is arranged rightward from the first input indicating image 181 corresponding to the first slide switch 20L. The second input indicating image 184 corresponding to the first slide switch 20L indicates the maximum flow rate level corresponding to the second operation direction for operating the first slide switch 20L.

Referring to the left and right figures in FIG. 15, the first and second input indicating images 181 and 184 corresponding to the second slide switch 20R are arranged on the other side (e.g., on the right side) of the attachment indicating image 180. The first input indicating image 181 corresponding to the second slide switch 20R indicates the maximum flow rate level corresponding to the third operation direction for operating the second slide switch 20R. The second input indicating image 184 corresponding to the second slide switch 20R is arranged rightward from the first input indicating image 181 corresponding to the second slide switch 20R. The second input indicating image 184 corresponding to the second slide switch 20R indicates the maximum flow rate level corresponding to the fourth operation direction for operating the second slide switch 20R.

According to the present embodiment, the first and second input indicating images 181 and 184 corresponding to the first flow rate control valve 33D (or the first slide switch 20L) and the first and second input indicating images 181 and 184 corresponding to the second flow rate control valve 33E (or the second slide switch 20R) are displayed on the flow rate setting screen Q3, thereby resulting in that four indicators are displayed on the flow rate setting screen Q3. However, the number of indicators is variable depending on the number of control valves 33 of which respective flow rate levels are set by means of the flow rate setting unit 79. For example, if there are three control valves 33 for setting flow rates of hydraulic fluid by means of the flow rate setting unit 76, six indicators are displayed on the flow rate setting screen Q3.

Referring to FIG. 15, each first input indicating image 181 includes a first setting scale 182 indicating a scale of the maximum flow rate level and a first setting index 183 indicating the maximum flow rate level in association with the first setting scale 182. The display control unit 60 commands that the first setting index 183 is displayed as being extendable and contractable vertically along the first setting scale 182 in correspondence to the set maximum flow rate level.

Referring to FIG. 15, the second input indicating image 184 includes a second setting scale 185 indicating a scale of the maximum flow rate level and a second setting index 186 indicating the maximum flow rate level in association with the second setting scale 185. The display control unit 60 commands that the second setting index 186 is displayed as being extendable and contractable vertically along the second setting scale 187 in correspondence to the set maximum flow rate level.

The display control unit 60 commands that either a unidirectional image I10*a* or a bidirectional image I10*b* is selectively displayed adjacently to (e.g., below) the set of first and second flow rate setting images 181 and 184 corresponding to the slide switch 20L or 20R required for operating the selected attachment 17.

For example, when the switching valve 50 is shifted to the first position 50*a* to discharge hydraulic fluid from the attachment 17 to the hydraulic fluid tank T via the second flow rate control valve 33E, the display control unit 60 commands to display the bidirectional image I10*b* adjacent to the corresponding set of flow rate setting images 181 and 184. On the other hand, when the switching valve 50 is shifted to the second position 50*b* to discharge hydraulic fluid from the attachment 17 to the hydraulic fluid tank T bypassing the second flow rate control valve 33E, the display control unit 60 commands to display the unidirectional image I10*a* below the corresponding first input indicating image 181 and/or second indicating image 184 which have/has unidirectional flow of hydraulic fluid therethrough. Incidentally, when the switching valve 50 is shifted to the second position 50b and hydraulic fluid is discharged from the attachment 17 to the hydraulic fluid tank T bypassing the second flow control valve 33E, the amount of hydraulic fluid supplied to a port of the attachment 17 from which hydraulic fluid is discharged becomes zero necessarily. Therefore, the display control unit 60 may command that the second input indicating image 184 corresponding to the second flow rate control valve 33E (i.e., the right operation switch 20R) is automatically displayed to indicate the flow rate of zero, thereby reducing the operator's operations with the display 57 so as to improve the efficiency of work based on operation of the working machine 1.

According to the present embodiment, the flow rate setting screen Q3 is set so that a first supply flow rate of the second flow rate control valve 33E indicated by the first input indicating image 181 is automatically zeroed. However, this is not adaptable to the case where the switching valve 50 is provided on another fluid line. For example, if the switching valve 50 is provided on the first fluid line 44 and hydraulic fluid discharged from the attachment 17 to the hydraulic fluid tank T bypasses the first flow rate control valve 33D, the first input indicating image 181 of the first flow rate control valve 33D automatically indicates the flow rate of zero. Therefore, the switching valve 50 drains hydraulic fluid discharged from the attachment 17 to the hydraulic fluid tank T so that the flow rate of hydraulic fluid discharged from the attachment 17 needs not to be set. In this case, an operator can zero the amount of hydraulic fluid supplied to the attachment 17 without operation. When hydraulic fluid discharged from the switching valve 50 to the hydraulic fluid tank T bypasses the corresponding flow rate control valve, i.e., the first or second flow rate control valve 33D or 33E, an operator can easily confirm information regarding the shift of the switching valve 50 and can easily confirm that the flow rate of hydraulic fluid in the draining line cannot be changed, thereby reducing waste operations of the display operation member 63 so as to improve the efficiency of work based on operation of the working machine 1.

In correspondence to the kind of selected attachment 17, the display control unit 60 commands that the flow rate setting image 181 or 184 corresponding to the operation direction of either the slide switch 20L or 20R required for operating the selected attachment 17 is prepared to accept operation to set the maximum flow rate level. On the other hand, in correspondence to the kind of selected attachment 17, the display control unit 60 commands that the flow rate setting image 181 or 184 corresponding to the operation direction of either the slide switch 20L or 20R unrequired for operating the selected attachment 17 is not prepared to accept the operation to set the maximum flow rate level.

Referring to FIG. 16, if a breaker or so on serves as the attachment 17 attached to the working machine 1, the switching valve 50 is set at the second position 50b and the kind of attachment 17 indicated by the attachment indicating image 180 is actuatable in response to unidirectional operation of the slide switch 20L or 20R in only one direction. In this case, the display control unit 60 commands that the first input indicating image 181 is prepared to accept the setting operation, and the second input indicating image 184 is not prepared to accept the setting operation. In other words, when an operator operates the rotary operation member 64a to set the maximum flow rate level indicated by the first input indicating image 181, the display control unit 60 commands the display 57 and the flow rate setting unit 76 to reflect this operation. On the other hand, when the operator operates to set the maximum flow rate level indicated by the second input indicating image 184, the display control unit 60 does not command the display 57 and the flow rate setting unit 76 to reflect this operation.

If the kind of attachment 17 indicated by the attachment indicating image 180 is actuatable in response to unidirectional operation of the slide switch 20L or 20R in only one direction other than the above-mentioned one direction, the display control unit 60 commands that the first input indicating image 181 is prepared to accept a setting operation while the second input indicating image 184 is not prepared to accept a setting operation. In other words, when an operator operates the rotary operation member 64a to set the maximum flow rate level indicated by the second input indicating image 184, the display control unit 60 commands the display 57 and the flow rate setting unit 76 to reflect this operation. On the other hand, when the operator operates to set the maximum flow rate level indicated by the first input indicating image 181, the display control unit 60 does not command the display 57 and the flow rate setting unit 76 to reflect this operation.

Referring to FIG. 16, if the kind of attachment 17 indicated by the attachment indicating image 180 is actuatable according to the flow control of both the first and second flow rate control valves 33D and 33E and in response to bidirectional operation of the slide switches 20L and 20R, e.g., in the case where a rotary grapple or so on is selected as the attachment 17 to be attached to the working machine 1, the display control unit 60 commands for preparation to accept settings of the first and second supply flow rates corresponding to the slide switch 20L, i.e., the first flow rate control valve 33D, and the third and fourth supply flow rates corresponding to the slide switch 20R, i.e., the second flow rate control valve 33E.

Referring to FIG. 16, if the kind of attachment 17 indicated by the attachment indicating image 180 is actuatable based on only the fluid supply from one of the first and second flow rate control valves 33D and 33E without use of the other flow rate control valve 33D or 33E and in response to bidirectional operation of either the slide switch 20L or 20R, e.g., in the case where the tilt bucket X2 or clamshell X4 is selected as the attachment 17 to be attached to the working machine 1, the display control unit 60 commands that the operation to set the first and second flow rates corresponding to the one flow rate control valve is accepted and the operation to set the first and second flow rates corresponding to the other flow rate control valve is not accepted.

When "AUX (Standard)" is selected to serve as the attachment 17 to be attached to the working machine 1, the display control unit 60 commands to accept setting of the first and second supply flow rates corresponding to the first flow rate control valve 33D and the first and second supply flow rates corresponding to the second flow rate control valve 33E and setting of shift information regarding shift of the target of flow rate setting, thereby enabling the flow rate settings to be changed.

The setting operation with the input indicating image 181 and second input indicating image 184 and the setting operation to set the shift information are performed by operating the rotary operation member 64a serving as the display operation member 63. More specifically, an operator rotates the rotary operation member 64a and depresses the pressing operation member 64b to select either the first input indicating image 181 indicating the first supply flow rate or the second input indicating image 184 indicating the second supply flow rate. The operation to change the setting content indicated by the selected first or second input indicating image 181 or 184 is performed by rotating the rotary operation member 64a. For example, any one of the first to fourth flow rates is increased by rotating the rotary operation member 64a clockwise and is reduced by rotating the rotary operation member 64a counterclockwise. The changed one of the first to fourth supply flow rates is determined or confirmed by operating the rotary operation member 64a and pressing operation member 64b to select the confirmation button 187.

Referring to FIG. 15, the display control unit 60 is configured to display selectively either an active state where the operation to set the maximum flow rate level is acceptable or an inactive state where the operation to set the maximum flow rate level is inacceptable so that the active state and the inactive state look different from each other. More specifically, in correspondence to the selected kind of attachment 17, the display control unit 60 commands so that the flow rate setting image 181 or 184 corresponding to the operation direction of the slide switch 20L or 20R required for operating the attachment 17 is displayed as being in the active state. On the other hand, in correspondence to the selected kind of attachment 17, the display control unit 60 commands so that the flow rate setting image 181 or 184 corresponding to the operation direction of the slide switch 20L or 20R unrequired for operating the attachment 17 is displayed as being in the inactive state. Accordingly, the operator can visually confirm the shift information regarding the shift of the switching valve 50 and the acceptability of settings of the flow rates of hydraulic fluid by means of the flow rate setting unit 76. Therefore, the operator is prevented from wastefully setting the first or second supply flow rate of hydraulic fluid to the attachment 17 which needs not to be set, e.g., in the case where the switching valve 50 is set to drain hydraulic fluid discharged from the attachment 17 to the hydraulic fluid tank T therethrough. If the kind of selected attachment 17 requires neither the slide switch 20L nor the slide switch 20R for its operation, e.g., if the bucket X1 is selected as the attachment 17 to be attached to the working machine 1, the display control unit 60 commands that all the flow rate setting images 181 and 184 corresponding to the selected kind of attachment 17 are displayed as being in the inactive state.

Each of the first input indicating image 181 and second input indicating image 184, when displayed as being in the inactive state, is shaded in gray (or is grayed out), for example, thereby looking different from that displayed as being in the active state. For example, the left figure in FIG. 15 illustrates the first input indicating image 181 corresponding to the second slide switch 20R (i.e., the second flow control valve 33E) displayed as being in the active state. Also, the right figure in FIG. 15 illustrates the first and second input indicating images 181 and 184 corresponding to the first slide switch 20L (i.e., the first flow rate control valve 33D) displayed as being in the active state. On the other hand, the left figure in FIG. 15 illustrates the first and second input indicating images 181 and 184 corresponding to the first slide switch 20L (i.e., the first flow rate control valve 33D) and the second input indicating image 184 corresponding to the slide switch 20R (i.e., the second flow rate control valve 33E) displayed as being in the inactive state. Therefore, the operator can easily visually recognize whether the setting operation to set the content indicated by each of the first and second input indicating images 181 and 184 is acceptable or not. Therefore, the operator is prevented from wastefully operating the display 57 although it is in the case where the maximum flow rate level cannot be set by operating the display 57. According to the present embodiment, the display control unit 60 commands that each flow rate setting image 181 or 184 in the inactive state is grayed out. Alternatively, the display control unit 60 may command that each flow rate setting image 181 or 184 in the inactive state is not displayed.

As mentioned above, the display controller 59 for controlling a content displayed on the display 57 provided on the working machine 1 comprises the display control unit 60 is configured to display, in the first display region 81 of the display 57, selectively either the plurality of arcuate graphic meter images 112 indicating conditions of the working machine 1 in the first display state or the photographed image 125 indicating the photographed surroundings of the working machine 1 in the second display state. The display control unit 60 is configured so that, in the first display state, the icon image 111 indicating information regarding the working machine 1 is displayed at the central portion of the first display region 81, and the graphic meter images 112 are displayed in the first display region 81 around the icon image 111. The display control unit 60 is configured so that, in the second display state, the icon image 111 is displayed in the second display region 82 of the display 57 smaller than the first display region 81, and the bar images 122 indicating of the same information as the graphic meter images 112 are displayed in the second display region 82 on both sides of the icon image 111.

Due to the above-mentioned configuration, an operator can simultaneously confirm both the conditions of the working machine 1 indicated by the bar images 122 and the surroundings of the working machine 1 indicated by the photographed image 125. Accordingly, the operator does not have to switch the display screen 58 of the display 57 to confirm both the conditions of the working machine 1 and the photographed image 125, and the operator can operate the working machine 1 while confirming both the conditions of the working machine 1 and the photographed image 125. The operator can intuitively grasp the position of the icon image because of the arrangement of the icon image surrounded by the graphic meter images. Further, since the display control unit 60 is configured to display the bar images 122 in the second display region 82 smaller than the first display region 81 in which the photographed image 125 is displayed, the displaying of both the photographed image 125 and the bar images 122 does not cause the bar images 122 to narrow the display area of the photographed image 125 so as to make the photographed image 125 hard to see. Therefore, the convenience of the display equipped on the working machine is improved.

The first display region 81 is displayed at the constant position regardless of whether it is displayed in the first display state or in the second display state.

Due to the above-mentioned configuration, for example, after the display control unit 60 changes the first display state to the second display state, the photographed image 125 is displayed at the same position as that where the conditions of the working machine 1 were indicated in the first display state before the change, and the conditions of the working machine 1 are indicated at the position different from that where the photographed image 125 is displayed. Therefore, when the display state is changed from the first display state to the second display state, the operator feels as if the images indicating the conditions of the working machine 1 slidingly came to be displayed in the second display state, thereby confirming both the conditions of the working machine 1 and the photographed image 125 without feeling uncomfortable.

When the certain warning event occurs, the display control unit 60 is configured to indicate the warning information in the second display region 82 to replace an image having been displayed therein before the occurrence of the warning event.

Due to the above-mentioned, in the second display state, the conditions of the working machine 1 can be indicated at the position for indicating the warning information unless the warning event occurs, thereby increasing the area for displaying the photographed image 125 while indicating the conditions of the working machine 1. The photographed image 125 is prevented from being partly concealed by the warning information. In other words, the greatly important content, such as the photographed image 125 displayed in the second display state or the conditions of the working machine 1 displayed in the first display state where the photographed image 125 is not displayed, is prevented from being concealed by the warning information.

The display control unit 50 is configured so that, in the first display state, the first graphic meter image 112*a* is displayed below the icon image 111, the second graphic meter image 112*b* is displayed rightward from the icon image 111 and first graphic meter image 112*a*, and the third graphic meter image 112*c* is displayed leftward from the icon image 111 and first graphic meter image 112*a*. The display control unit 60 is configured to display the first, second and third bar images 122*a*, 122*b* and 122*c* so that at least one of them is displayed rightward from the icon image 121 and the other/others of them is/are displayed leftward from the icon image 121. The first bar image 122*a* indicates the same information as the first graphic meter image 112*a*. The second bar image 122*b* indicates the same information as the second graphic meter image 112*b*. The third bar image 122*c* indicates the same information as the third graphic meter image 112*c*.

Due to the above-mentioned configuration, after the display control unit 60 changes from the first display state to the second display state, although the second work indicating images 102 are displayed at the position different from that where the first work indicating images 101 have been displayed, the bar images 122 are displayed adjacently to the icon image 121 in the second display state similar to the graphic meter images 112 displayed adjacently to the icon image 111 in the first display state, thereby enabling the operator to intuitively and easily grasp the positions where the respective graphic meter images are displayed.

Each of the first graphic meter image 112*a* and first bar image 122*a* indicates the residual quantity of fuel. Each of the second graphic meter image 112*b* and second bar image 122*b* indicates the temperature of engine oil or engine cooling water. Each of the third graphic meter image 112*c* and third bar image 122*c* indicates the temperature of hydraulic fluid.

Due to the above-mentioned configuration, the display control unit 60 commands that the second graphic meter image 112*b* and third graphic meter image 112*c* indicating the kinds of information regarding the respective temperatures are distributedly displayed on the lateral opposite sides of icon image 111. Therefore, while the conditions of the working machine 1 include some kinds of temperatures and the residual quantity of fuel, the pieces of information regarding the respective kinds of temperatures which fluctuate in comparison with the residual quantity of fuel are not displayed at the central portion, thereby leading the operator to concentrate the work.

The display control unit 60 is configured to display the first to third graphic meter images 112*c*, each in an arcuate shape, arranged so as to surround the icon image 111.

Due to the above-mentioned configuration, the first graphic meter image 112*a*, second graphic meter image 112*b* and third graphic meter image 112*c* emphasize the area displaying the icon image 111 so that the operator can grasp the information indicated by the icon image 111 more instinctively and easily. The first, second and third graphic meter images 112*a*, 112*b* and 112*c* define the border of the area, thereby simplifying and clearing the entire content displayed on the display 57.

The display 57 includes the rectangular display screen 58. In the second display state, the display control unit 60 is configured to display, on the display 57, the first to third bar images 122*a* to 122*c* extending in the longitudinal direction of the display screen 58 and arranged at substantially the same position in the longitudinal direction of the display screen 58.

Due to the above-mentioned configuration, the bar image 122 is compactly arranged in the second display region 82 that is smaller than the first display region 81, thereby ensuring the sufficiently large area as the first display region 81 for displaying the photographed image 125.

The working machine 1 comprises the display controller 59 and the display 57 with a content controlled by the display controller 59 to be displayed thereon.

Due to the above-mentioned configuration, the working machine 1 benefits by the above-mentioned excellent effects of the display controller 59.

The program to be executed by a computer is provided for the processing by means of the display control unit 60 in the display controller 59.

Due to the above-mentioned configuration, the execution of the program by the computer achieves the display controller 59 having the above-mentioned excellent effects.

The storage medium 61 stores the program so that the computer can read the program from the storage medium.

Due to the above-mentioned configuration, the computer is commanded to read the program from the storage medium 61 and to execute the program, thereby achieving the display controller 59 having the above-mentioned excellent effect.

The display controller 59 for controlling a content displayed on the display 57 provided on the working machine 1 comprises the display control unit 60 configured to display, on the display 57, the icon image 111 indicating the information regarding the working machine 1 and the plurality of graphic meter images 112 indicating conditions of the working machine 1. The display control unit 60 is configured to display the graphic meter images 112, each in an arcuate shape, arranged so as to surround the icon image 111.

Due to the above-mentioned configuration, the arcuate graphic meter images 112 surround the icon image 111 indicating the information regarding the working machine 1, so that the operator can intuitively grasp the contents indicated by the icon image 111 and respective graphic meter images 112, thereby improving the visibility of the display 57.

The display control unit 60 is configured to display the graphic meter images 112 arranged to collectively form an outline of the common circle O so that each graphic meter image 112 defines a part of the circle O.

Due to the above-mentioned configuration, the alignment of the plurality of graphic meter images 112 clearly defines the common circle O as the border of the area defined by the plurality of graphic meter images 112 so that the icon image 111 surrounded by the circle O can easily catch the operator's attention, thereby enabling the operator to easily grasp the information indicated by the icon image 111.

The display control unit 60 is configured to display the graphic meter images 112 including the first graphic meter image 112a arranged below the icon image 111, the second graphic meter image 112b arrange rightward from the icon image 111 and the third graphic meter image 112c arranged leftward from the icon image 111.

Due to the above-mentioned configuration, the first graphic meter image 112a is displayed as extending laterally while the second and third graphic meter images 112b and 112c are displayed as extending vertically. Therefore, the extension direction of the first graphic meter image 112a is different from those of the second and third graphic meter images 112b and 112c, and the second and third graphic meter images 112b and 112c are displayed as being separated from each other, thereby enabling the operator to grasp the respective pieces of information indicated by the respective graphic meter images 112 without confusion.

The icon image 111 indicates the attachment 17 attached to the working machine 1.

Due to the above-mentioned configuration, the information regarding the attachment 17 attached to the working machine 1 is displayed in the region visible to the operator. Therefore, the operator can easily grasp the information regarding the attachment 17 which is relatively greatly important information of the pieces of information regarding the working machine 1.

The display control unit 60 is configured to display the graphic meter images including some or all of the graphic meter images 112 indicating the residual quantity of fuel for driving the engine E equipped on the working machine 1, the temperature of engine oil or engine cooling water, and the temperature of hydraulic fluid for driving the attachment 17 attached to the working machine 1.

Due to the above-mentioned configuration, the graphic meter images 112 are displayed to indicate the pieces of information expressed as numerical values that are relatively important for operating the working machine 1 and to surround the icon image 111, thereby enabling the operator to easily find the important pieces of information together with the conspicuous icon image 111.

The display control unit 60 is configured to display the meter icon images 115a to 115c adjacent to the graphic meter images 112, each of the meter icon images 115a to 115c corresponding to information indicated by each of the graphic meter images 112.

Due to the above-mentioned configuration, the operator needs not to remember which piece of information is indicated by each graphic meter image 112 as preparation for operating the working machine 1. The operator can easily confirm which piece of information each graphic meter image 112 indicates simultaneously with the confirmation of each graphic meter image 112.

The working machine 1 comprises the display controller 59 and the display 57 on which a content controlled by the display controller 59 is displayed.

Due to the above-mentioned configuration, the working vehicle 1 benefits by the excellent effects of the display controller 59.

The program to be executed by the computer is provided for the processing by means of the display control unit 60 in the display controller 59.

Due to the above-mentioned configuration, the execution of the program by the computer achieves the display controller 59 having the above-mentioned excellent effects.

The storage medium 61 stores the program so that the computer can read the program from the storage medium 61.

Due to the above-mentioned configuration, the computer is commanded to read the program from the storage medium 61 and to execute the program, thereby achieving the display controller 59 having the above-mentioned excellent effects.

The display controller 59 for controlling a content displayed on the display 57 provided on the working machine 1 comprises the display control unit 60 configured to display, on the display 57, information regarding the working machine 1. The display control unit 60 is configured so that, when the predetermined menu displaying operation is performed, the menu image 140 indicating the plurality of optional items is displayed in the partial section of the display screen 58 of the display 57.

Due to the above-mentioned configuration, when the predetermined menu displaying operation is performed, the menu image 140 is displayed on the display screen 58, thereby not requiring button switches or so on as many as the optional items to be provided adjacently to the display screen 58. Therefore, the display 57 can be entirely minimized in comparison with that when provided with the button switches or so on. Unless the predetermined menu displaying operation is performed, any other image can be displayed instead of the menu image, thereby extending the effective utilization range of the display screen 58 and enhancing the operator's convenience.

The display control unit 60 is configured to display the menu image 140 linearly along the outer peripheral edge portion of the display screen 58.

Due to the above-mentioned configuration, the display control unit 60 commands so that the menu image 140 is displayed along the outer peripheral edge portion of the display screen 58, thereby enabling the information regarding the working machine 1 to be indicated in a region (including at least the center portion of the display screen 58) other than the outer peripheral edge portion of the display screen 58. Therefore, the menu image 140 is displayed while the information regarding the working machine 1 is indicated in the conspicuous region prevented from being concealed by the menu image 140.

The display control unit 60 is configured so that, when the menu displaying operation is performed, the menu image 140 is displayed as sliding inward on the display screen 58 from the outer peripheral edge portion of the display screen 58 so as to gradually expand its visualized area.

Due to the above-mentioned configuration, the operator can visibly recognize the menu image 140 concealing a part of the region where the information regarding the working machine 1 is indicated. Therefore, the operator understands that the menu displaying operation is required to redisplay the concealed part of the region, thereby improving the operability of the display 57. For example, the sliding of the menu image 140 inward on the display screen 58 from the hand-side outer edge of the display screen 58 enhances the operability for selecting the menu image 140 and also suggests that an image other than the menu image 140 can be displayed in any place out of the menu image 140, thereby promoting the recognition of screen transition.

The display control unit 60 is configured so that, when the menu displaying operation is performed, the menu image 140 is displayed as sliding upward from the bottom edge portion of the display screen 58 so as to gradually expand its visualized area.

Due to the above-mentioned configuration, the sliding of the menu image 140 upward on the display screen 58 from the operator's hand-side bottom edge portion of the display screen 58 means that the target of the selecting operation is displayed at the operator's hand-side, thereby enhancing the operability.

The display control unit 60 is configured so that, when the operator selects any one of the items indicated by the menu image 140, the setting screen Q3 corresponding to the selected item is displayed.

Due to the above-mentioned configuration, the operator can perform the operation to display the setting screen Q3 while confirming the information regarding the working machine 1. Therefore, the operator's judgment of which screen should be displayed is surely based on the corresponding condition of the working machine 1.

The display control unit 60 is configured so that, in the normal display state, the graphic meter images 112 or bar images 122 indicating the conditions of the working machine 1 are displayed in the main display regions 81 and 82 including the central portion of the display screen 58, and the supplementary information 135 different from the content displayed in the main display regions 81 and 82 is displayed in the auxiliary display region 83 between the main display regions 81 and 82 and the peripheral edge portion of the display screen 58. The display control unit 60 is configured so that, when the menu displaying operation is performed, the menu image 140 is displayed in the auxiliary display region 83 to partly or fully replace the supplementary information 135.

Due to the above-mentioned configuration, of the pieces of information displayed on the display screen 58, the menu image 140 can be displayed at the portion where relatively less important information including the supplementary information 135 is indicated. Therefore, the operator can perform the operation for settings of the working machine 1 while confirming the displayed relatively important information.

The display control unit 60 is configured to no longer display the menu image 140 when the state where no operation is applied to the menu image 140 continues after the lapse of the predetermined period of time from the start of displaying the menu image 140.

Due to the above-mentioned configuration, when the predetermined period of time has passed after the start of displaying the menu image 140 for some reasons, e.g., because the operator interrupts the operation for the item selection and leaves the working machine 1, the information regarding the working machine 1 can be displayed automatically.

The working machine 1 comprises the display controller 59, the display 57 on which a content controlled by the display controller 59 is displayed, and the display operation member 63 for inputting instruction to the display controller 59.

Due to the above-mentioned configuration, the working machine 1 benefits by the above-mentioned excellent effect of the display controller 59.

The working machine 1 comprises the rotary operation member 64a which is rotationally operable and the pressing operation member 64b which is operable by pressing so that each of the rotary operation member 64a and pressing operation member 64b serves as the display operation member 63. The display control unit 60 is configured to display one of the plurality of items indicated by the menu image 140 as a candidate distinguishingly from the other items. to transition the candidate from the present item to a new item according to the rotational operation of the rotary operation member 64a, to determine the item having been indicated as the candidate to become a selected item when the operation of pressing the pressing operation member 64b is performed, and to display, on the display 57, the setting screen Q3 corresponding to the item determined as the selected item.

Due to the above-mentioned configuration, the operator can rotate the rotary operation member 64a by his/her one hand so as to select one of the items as the candidate. Therefore, the operator can perform another operation for the working machine 1 by his/her other hand. The operator can easily grasp the candidate item because the candidate item is displayed distinguishingly from the other items.

The program to be executed by a computer is provided for the processing by means of the display control unit 60 in the display controller 59.

Due to the above-mentioned configuration, the execution of the program by the computer achieves the display controller 59 having the above-mentioned excellent effects.

The storage medium 61 stores the program so that the computer can read the program from the storage medium 61.

Due to the above-mentioned configuration, the computer is commanded to read the program from the storage medium 61 and to execute the program, thereby achieving the display controller 59 having the above-mentioned excellent effect.

The display controller 59 comprises the display control unit 60 for controlling a content displayed on the display 57 provided on the working machine 1. The display control unit 60 is configured to display, in the first display region 81 of the display screen 58 of the display 57, either the graphic meter images 112 indicating the respective conditions of the working machine 1 or the photographed image 125 indicating the surroundings of the working machine 1. The display control unit 60 is configured so that, when a predetermined warning condition occurs, a piece of warning information corresponding to the occurring warning condition is indicated in the second display region 82 which is smaller than the first display region 81. The display control unit 60 is configured so that, when a plurality of warning conditions occur, a piece of warning information corresponding to one of the plurality of warning conditions is indicated in the second display region 82 and the number of the pieces of warning information corresponding to the occurring warning conditions is indicated on the display screen 58.

Due to the above-mentioned configuration, the operator can easily find the warning condition occurrence/occurrences and the number of the warning condition occurrences without disturbing the display of the graphic meter images 112 or photographed image 125 in the first display region 81. The display control unit 60 enables the indication of the warning information in the second display region 82 while the conditions of the working machine 1 or the photographed image 125 are/is displayed in the first display region 81. In other words, the display control unit 60 enables the display of the warning information without concealing the indication of conditions of the working machine 1 or the photographed image 125 which may be necessary to operate the working machine 1. Accordingly, the operator can confirm the warning information and the number of warnings while confirming the conditions or surroundings of the working machine 1. Therefore, the display of the warning information does not hinder the operator's work, and the operator can promptly cope with the warning condition based on the content of the warning information.

The display control unit 60 is configured so that, when a plurality of warning conditions occur and an instruction is given to transition the indication of warning information from one piece of warning information corresponding to one of the warning conditions to another piece of warning information corresponding to another of the plurality of warning conditions, the piece of warning information indicated in the second display region 82 is transitioned to the other piece of warning information.

Due to the above-mentioned configuration, the operator can confirm all pieces of warning information corresponding to the occurring warning conditions by transitioning the indication of warning information in the second display region 82 while confirming the conditions or surroundings of the working machine 1. Therefore, in response to the occurrence of the plurality of warning conditions, the operator can promptly cope with all the pieces of warning information.

The display control unit 60 is configured so that, when the operation to select the piece of warning information indicated in the second display region 82 is performed, the piece of first detailed information 154 regarding the selected piece of warning information is indicated in the detail display region including the first display region 81.

Due to the above-mentioned configuration, when the operator needs to know the detail of the warning information, the operator can get the piece of first detailed information 154 indicated in the first display region 81 instead of the conditions of the working machine 1 or the photographed image 125. In correspondence to the volume of information, the operator can select either one screen on which the piece of warning information is indicated together with the conditions of the working machine 1 or the photographed image 125 or another screen on which the piece of first detailed information 154 is indicated, thereby enabling the operator to continue the work without reduction of the area indicating the conditions of the working machine 1 or the photographed image 125 by the issue of warning. The operation to select one piece of warning information is simple so that the piece of first detailed information 154 can be quickly indicated, thereby reducing the time of interrupting the work caused by the operation of the display controller 59.

The piece of first detailed information 154 has a volume such that it fits in one page of the detail display region. The display controller 60 is configured so that, when a plurality of warning conditions occur and an instruction to transition from the presently indicated piece of first detailed information 154 regarding one piece of warning information to another piece of warning information is given, another piece of first detailed informant 154 regarding the other piece of warning information is indicated in the detail display region.

Due to the above-mentioned configuration, while the display 57 indicates one piece of first detailed information 154 corresponding to one piece of warning information, the display 57 can quickly change the indicated information to another piece of the first detailed information 154 corresponding to another piece of warning information. Therefore, when the working machine 1 is left free of operation, e.g., after the work is finished up, the operator can run the pieces of first detailed information 154 in turn by the simple operation.

The display control unit 60 is configured so that, when a plurality of warning conditions occur and the instruction to transition the indication of warning information from the piece of warning information to a list of pieces of warning information corresponding to the respective warning conditions is given, the list of pieces of warning information is indicated.

Due to the above-mentioned configuration, the operator can confirm the pieces of warning information corresponding to the respective warning conditions from the list thereof. Therefore, when the working machine 1 is left with no operation for a relatively short time, e.g., during interruption of the work based on operation of the working machine 1, the operator can confirm all the pieces of warning information at once. Since the pieces of warning information are indicated in the list, when the operator questions a dealer on any piece or pieces of warning information, the operator can easily inform the dealer regarding the piece or pieces of warning information.

The display control unit 60 is configured so that, when the operation to select any one of the pieces of warning information in the list is performed, the piece of second detailed information 159 regarding the selected warning information is indicated in the detail display region. The volume of the piece of second detailed information 159 is greater than that of the piece of first detailed information 154.

Due to the above-mentioned configuration, a person, e.g., an operator or a dealer, who needs to confirm the warning information can use the first detailed information 154 and the second detailed information 159 for the respective different purposes. Therefore, each person who needs to confirm the warning information can change the content of information suitably, thereby surely getting the warning information with most desired or required content.

When the piece of second detailed information 159 to be indicated has a great volume such as to exceed that fitting in one page of the detail display region, the whole content of the second detailed information 159 can be indicated in the detail display region by paging or scrolling.

Due to the above-mentioned configuration, even if the content of the warning condition corresponding to the piece of second detailed information 159 to be indicated is complicated and the piece of second detailed information 159 to be indicated has a relatively great volume, the piece of second detailed information 159 can be indicated in the detail display region. The person who needs to confirm the warning information can grasp the whole content of the second detailed information 158 by the simple operation such as paging or scrolling.

The working machine 1 comprises the display controller 59 and the display 57 on which a content controlled by the display controller 59 is displayed.

Due to the above-mentioned configuration, the working machine 1 benefits by the above-mentioned excellent effects of the display controller 59.

The program to be executed by a computer is provided for the processing by means of the display control unit 60 in the display controller 59.

Due to the above-mentioned configuration, the execution of the program by the computer achieves the display controller 59 having the above-mentioned excellent effects.

The storage medium 61 stores the program so that the computer can read the program from the storage medium 61.

Due to the above-mentioned configuration, the computer is commanded to read the program from the storage medium 61 and to execute the program, thereby achieving the display controller 59 having the above-mentioned excellent effect.

The display controller 59 is configured to indicate, on the display 57 in the working machine 1, the maximum flow rate level of hydraulic fluid supplied or discharged to and from the actuator for driving the attachment 17. The display controller 59 comprises the storage unit 61 and the display control unit 60. The storage unit 61 stores the plural kinds of attachments 17 capable of being attached to the working machine 1 and the settings of the maximum flow rates levels corresponding to the respective kinds of attachments 17. The display control unit 60 is configured to indicate, on the display 57, the list of the settings of the maximum flow rate levels corresponding to the respective kinds of attachments 17.

Due to the above-mentioned configuration, the operator can easily confirm the settings of the maximum flow rate levels of hydraulic fluid to be supplied to the respective kinds of attachments 17 available to be attached to the working machine 1.

Each setting of the maximum flow rate level of hydraulic fluid is indicated in correspondence to each of the kinds of attachments 17 capable of being attached to the working machine 1, in correspondence to each operation member 20L or 20R required for operating the corresponding attachment 17, and in correspondence to each operation direction required for operating the required operation member 20L or 20R.

Due to the above-mentioned configuration, for preparation of operating the attachment 17, the operator can confirm the list indicating the setting contents of the maximum flow rate levels each of which is associated with each operation member 20L or 20R required for operating the optionally selected attachment 17, and with each operation direction required for operating the required operation member 20L or 20R. Therefore, the operator can recognize the maximum flow rate levels indicated by the display 57 in association with the respective operation directions of the operation members 20L and 20R.

The working machine 1 comprises the left operation switch 20L and the right operation switch 20R which serve as the operation members 20L and 20R. The left operation switch 20L is operable in the first operation direction and the second operation direction, and the right operation switch 20R is operable in the third operation direction and the fourth operation direction. The display control unit 60 is configured to indicate the maximum flow rate levels corresponding to the respective first to fourth operation directions.

Due to the above-mentioned configuration, each of the left and right operation switches 20L and 20R is operable in two directions, and according to the command from the display control unit 60, the maximum flow rate levels corresponding to the respective directions are indicated. Accordingly, the operation members 20L and 20R are operable to move the attachment 17 in at least four directions so as to facilitate the movement control of the attachment 17, thereby improving the efficiency of work based on operation of the working machine 1.

The storage unit 61 stores the icon images 171 corresponding to the respective kinds of attachments 17. The display control unit 60 is configured to display, on the display 57, the icon images 171 corresponding to the respective kinds of attachments 17 with the maximum flow rate levels corresponding to the first and second operation directions indicated leftward from the icon image 171 and the maximum flow rate levels corresponding to the third and fourth operation directions indicated rightward from the icon image 171.

Due to the above-mentioned configuration, according to the command from the display control unit 60, the maximum flow rate levels corresponding to the left operation switch 20L is indicated leftward from the icon image 171, and the maximum flow rate levels corresponding to the right operation switch 20R rightward from the icon image 171. Therefore, the left-and-right positional relation between the left and right operation switches 20L and 20R coincides to the left-and-right positional relation between the indication position of the maximum flow rate levels corresponding to the left operation switch 20L and the indication position of the maximum flow rate levels corresponding to the right operation switch 20R. The operator can easily understand the maximum flow rate levels distinguishingly from each other without confusion between the positions of the operation members 20L and 20R and the indication positions of the maximum flow rate levels.

The display control unit 60 is configured so that either the unidirectional image 19a indicating that the flow of hydraulic fluid supplied or discharged to and from one attachment 17 selected from the plurality of kinds of attachments 17 is unidirectional or the bidirectional image 19b indicating that the flow of hydraulic fluid supplied or discharged to and from the selected attachment 17 is bidirectional is displayed adjacently to each image indicating the maximum flow rate level or levels corresponding to each operation member 20L or 20R required for operating the selected attachment 17.

Due to the above-mentioned configuration, according to the command from the display control unit 60, each image indicating whether the corresponding flow direction of hydraulic fluid supplied or discharged to and from the attachment 17 is unidirectional or bidirectional is displayed, so that the operator can see these images for preparation of operation of the attachment 17 to understand whether the operation of the attachment 17 is unidirectional or bidirectional, and what needs the setting of the flow rate level, thereby reducing wasteful operations for instructing the display control unit 60 so as to enhance the efficiency of work based on operation of the working machine 1.

The display control unit 60 is configured to display, when the list is displayed and the operation to select one of the optional attachments 17 indicated in the list is performed, the flow rate setting images 181 and 184 for changing the settings of the flow rate levels in correspondence to the selected attachment 17.

Due to the above-mentioned configuration, according to the command from the display control unit 60, the setting contents of the selected attachment 17 are displayed for a preview. Accordingly, the operator can see the list for preparation of operation of the selected attachment 17 to understand which of the setting contents indicated in the list must be changed. Therefore, the operator can reduce wrong operations to select any attachment 17 other than that requiring the change of setting. No additional operation is required to confirm the setting content, thereby reducing the number of operator's laborious operations.

The working machine 1 comprises the display controller 59 and the display 57 on which a content controlled by the display controller 59 is displayed.

Due to the above-mentioned configuration, the working machine 1 benefits by the above-mentioned excellent effects of the display controller 59.

The program to be executed by a computer is provided for the processing by means of the display control unit 60 in the display controller 59.

Due to the above-mentioned configuration, the execution of the program by the computer achieves the display controller 59 having the above-mentioned excellent effects.

The storage medium 61 stores the program so that the computer can read the program from the storage medium 61.

Due to the above-mentioned configuration, the computer is commanded to read the program from the storage medium 61 and to execute the program, thereby achieving the display controller 59 having the above-mentioned excellent effect.

The display controller 59 is configured to display, on the display 57 in the working machine 1, the flow rate setting images 181 and 184 for variably setting the maximum flow rate levels of hydraulic fluid supplied or discharged to and from the actuator for driving the attachment 17 attached to the working machine 1 including the operation members 20L and 20R each operable in the operation directions. The display controller 59 comprises the storage unit 61 and the display control unit 60. The storage unit 61 stores the plural kinds of attachments 17 capable of being attached to the working machine 1, at least one of the operation members 20L and 20R required to operate each of the stored kinds of attachments 17, and at least one of the operation directions for operation of the required at least one operation member 20L or 20R to operate each of the stored kinds of attachments 17. The display control unit 60 is configured to display, on the display 57, when an operation to set the maximum flow rate levels of hydraulic fluid corresponding to one attachment 17 selected from the stored kinds of attachments 17 is performed, the flow rate setting images 181 and 184 which correspond to the respective operation members 20L and 20R and correspond to the respective operation directions of each of the operation members 20L and 20R. Any of the flow rate setting images, which corresponds to the at least one operation member 20L or 20R required to operate the selected kind of attachment 17 and corresponds to the at least one operation direction of the required at least one operation member 20L or 20R required to the selected kind of attachment 17, is displayed as being in an active state indicating that the variable setting of the corresponding flow rate level is acceptable. Any of the flow rate setting images, which corresponds to the at least one operation member 20L or 20R or corresponds to the at least one operation direction unrequired to operate the selected kind of attachment 17, is displayed as being in the inactive state indicating that the variable setting of the corresponding flow rate level is inacceptable, or is not displayed.

Due to the above-mentioned configuration, the operator can visually and easily recognize which flow rate level of hydraulic fluid can be variably set because the item which does not require setting of the corresponding maximum flow level is displayed as being in the inactive state indicating that the flow rate setting input is inacceptable. Therefore, the confirmation of whether each of the maximum flow rates is indicated as being in the active state or in the inactive state or is not indicated reduces cases of wasteful operation such that an operation to change the setting of maximum flow rate level is performed even in the case where the operation is inacceptable, thereby enhancing the convenience of the display 57.

The display control unit 60 is configured to gray out the flow rate setting image 181 or 184, when displayed as being in the inactive state.

Due to the above-mentioned configuration, the operator can visually and intuitively recognize whether the respective maximum flow rate levels can be set or not, thereby easily reducing wasteful operator's operations to change the set maximum flow rate level.

The display control unit 60 is configured so that the flow rate setting image 181 or 184 displayed as being in the inactive state indicates the corresponding maximum flow rate level of zero.

Due to the above-mentioned configuration, the operator can see the flow rate setting image 181 or 184 displayed as being in the inactive state so as to easily understand that the maximum flow rate level cannot be adjusted or changed by operating the corresponding operation member 20L or 20R in the corresponding operation direction and that hydraulic fluid cannot be supplied by the same operation, thereby reducing wasteful operator's operations so as to enhance the efficiency of work based on operation of the working machine 1.

In addition, the working machine 1 comprises the left operation switch 20L and the right operation switch 20R which serve as the operation members 20L and 20R. The left operation switch 20L is operable in the first operation direction and the second operation direction, and the right operation switch 20R is operable in the third operation direction and the fourth operation direction. The display control unit 60 is configured to display the flow rate setting images 181 and 184 corresponding to the respective first to fourth operation directions.

Due to the above-mentioned configuration, the operator can easily individually set the maximum flow rate level for operating the left operation switch 20L in the first and second operation directions and the maximum flow rate level for operating the right operation switch 20R in the third and fourth operation directions while viewing the flow rate setting images 181 and 184.

The storage unit 61 stores the attachment indicating images 180 corresponding to the respective kinds of optional attachments 17. The display control unit 60 is configured to display, on the display 57, the attachment indicating image 180 corresponding to the attachment 17 selected from the stored kinds of attachments 17, the flow rate setting images 181 and 184 corresponding to the respective first and second operation directions leftward from the attachment indicating image 180, and the flow rate setting images 181 and 184 corresponding to the respective third and fourth operation directions rightward from the attachment indicating image 180.

Due to the above-mentioned configuration, according to the command from the display control unit 60, the maximum flow rate level corresponding to the left operation switch 20L is indicated leftward from the attachment indicating image 180, and the maximum flow rate level corresponding to the right operation switch 20R is indicated rightward from the attachment indicating image 180. Therefore, the operator can easily understand the maximum flow rate levels distinguished from each other without confusion between the positions of the operation members 20L and 20R and the indication positions of the maximum flow rate levels.

The display control unit 60 is configured so that, when the flow of hydraulic fluid supplied or discharged to and from the selected attachment 17 is unidirectional, the supply/discharge flow setting image I10a indicating that the flow of hydraulic fluid supplied or discharged to and from the selected attachment 17 is unidirectional is displayed adjacently to the flow rate setting images 181 and 184 corresponding to the operation member 20L or 20R required to operate the selected attachment 17.

Due to the above-mentioned configuration, according to the command from the display control unit 60, the flow direction of hydraulic fluid supplied or discharged to and from the selected attachment 17 is indicated as being unidirectional, so that the operator can understand that the operational movement of the attachment 17 is unidirectional and that he/she does not have to operate to set multiple maximum flow rate levels, thereby reducing waste operations for instructing the display control unit 60 so as to enhance the efficiency of work based on operation of the working machine 1.

The working machine 1 comprises the display controller 59 and the display 57 on which a content controlled by the display controller 59 is displayed.

Due to the above-mentioned configuration, the working machine 1 benefits by the above-mentioned excellent effects of the display controller 59.

The program to be executed by a computer is provided for the processing by means of the display control unit 60 in the display controller 59.

Due to the above-mentioned configuration, the execution of the program by the computer achieves the display controller 59 having the above-mentioned excellent effects.

The storage medium 61 stores the program so that the computer can read the program from the storage medium 61.

Due to the above-mentioned configuration, the computer is commanded to read the program from the storage medium 61 and to execute the program, thereby achieving the display controller 59 having the above-mentioned excellent effect.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A display controller for controlling content displayed on a display provided on a working machine, the display controller comprising:
    a display control unit configured to display, in a first display region of the display, selectively either a plurality of arcuate graphic meter images indicating conditions of the working machine in a first display state or a photographed image of surroundings of the working machine in a second display state,
    wherein the display control unit is configured so that, in the first display state, an icon image is displayed at a central portion of the first display region, and the graphic meter images are displayed in the first display region around the icon image, and
    wherein the display control unit is configured so that, in the second display state, the icon image is displayed in a second display region of the display smaller than the first display region, and bar images indicating the same information as the graphic meter images are displayed in the second display region on both sides of the icon image.

2. The display controller according to claim 1,
    wherein the display control unit is configured so that, when a predetermined menu displaying operation is performed, a menu image indicating a plurality of optional items is displayed in a partial section of a display screen of the display.

3. The display controller according to claim 1,
    wherein the display control unit is configured to display, in the first display region of a display screen, either the plurality of graphic meter images or the photographed image of surroundings of the working machine,
    wherein the display control unit is configured so that, when a predetermined warning condition of the working machine occurs, a piece of warning information corresponding to the occurring warning condition is indicated in the second display region which is smaller than the first display region, and
    wherein the display control unit is configured so that, when a plurality of warning conditions occurs, a piece of warning information corresponding to one of the warning conditions is indicated in the second display region, and the number of the pieces of warning information corresponding to the occurring warning conditions is indicated on the display screen.

4. The display controller according to claim 1,
    wherein the display controller is configured to indicate, on the display, maximum flow rate levels of hydraulic fluid supplied or discharged to or from an actuator for driving an attachment,
    wherein the display controller comprises a storage unit storing plural kinds of attachments capable of being attached to the working machine and settings of the maximum flow rate levels corresponding to the respective kinds of attachments, and
    wherein the display control unit is configured to indicate, on the display, a list of the settings of the maximum flow rate levels corresponding to the respective kinds of attachments.

5. The display controller according to claim 1,
    wherein the display controller is configured to display, on the display, flow rate setting images for variable setting of maximum flow rate levels of hydraulic fluid supplied or discharged to or from an actuator for driving an attachment attached to the working machine including operation members each operable in operation directions,
    wherein the display controller comprises a storage unit that stores plural kinds of attachments capable of being attached to the working machine, at least one of the operation members required to operate each of the stored kinds of attachments, and at least one of the operation directions for operation of the required at least one operation member to operate each of the stored kinds of attachments,
    wherein the display control unit is configured to display, on the display, when an operation to set the maximum flow rate levels of hydraulic fluid corresponding to one attachment selected from the stored kinds of attachments is performed, flow rate setting images which correspond to the respective operation members and correspond to the respective operation directions of each of the operation members,
    wherein any of the flow rate setting images, which corresponds to the at least one operation member required to operate the selected kind of attachment and corresponds to the at least one operation direction of the required at least one operation member required to operate the selected kind of attachment, is displayed as being in an active state indicating that the variable setting of the corresponding maximum flow rate level is acceptable, and
    wherein any of the flow rate setting images, which corresponds to the at least one operation member unrequired to operate the selected kind of attachment or corresponds to the at least one operation direction unrequired to operate the selected kind of attachment, is displayed as being in an inactive state indicating that the variable setting of the corresponding maximum flow rate level is inacceptable, or is not displayed.

6. A working machine comprising:
    the display controller according to claim 1; and
    a display displaying content that is controlled by the display controller.

7. A computer readable storage medium, which stores a program to be executed by a computer for a processing by means of the display control unit in the display controller according to claim 1.

8. A display controller for controlling content displayed on a display provided on a working machine, the display controller comprising:
a display control unit configured to display, in a first display region of en the display, selectively either an icon image indicating information regarding the working machine and a plurality of graphic meter images indicating conditions of the working machine in a first display state or a photographed image of surroundings of the working machine in a second display state,
wherein, in the first display state, the display control unit is configured to display the graphic meter images, each in an arcuate shape, arranged to collectively form an outline of a common phantom circle so that each of the graphic meter images defines a part of the phantom circle and that the icon image is located within the phantom circle and surrounded by the graphic meter images,
wherein, in the second display state, the display control unit is configured to display, in a second display region of the display, the icon images and bar images indicating the same information as the graphic meter images.

9. The display controller according to claim 8,
wherein the display control unit is configured to display the graphic meter images each in an arcuate shape such that the phantom circle has a center thereof at a central portion of the icon image.

10. The display controller according to claim 8,
wherein the display control unit is configured to display the graphic meter images including a first graphic meter image arranged below the icon image, a second graphic meter image arranged rightward from the icon image, and a third graphic meter image arranged leftward from the icon image.

11. The display controller according to claim 8,
wherein the icon image indicates an attachment attached to the working machine.

12. The display controller according to claim 8,
wherein the display control unit is configured to display the graphic meter images including some or all of graphic meter images indicating a residual quantity of fuel for driving an engine equipped on the working machine, a temperature of engine oil or engine cooling water for the engine, and a temperature of hydraulic fluid for driving an attachment attached to the working machine.

13. The display controller according to claim 8,
wherein the display control unit is configured to display meter icon images adjacent to the graphic meter images, each of the meter icon images corresponding to information indicated by each of the graphic meter images.

14. The display controller according to claim 8,
wherein the display control unit is configured so that, when a predetermined menu displaying operation is performed, a menu image indicating a plurality of optional items is displayed in a partial section of a display screen of the display.

15. The display controller according to claim 8,
wherein the display control unit is configured to display, in a first display region of a display screen, either the plurality of graphic meter images or a photographed image of surroundings of the working machine,
wherein the display control unit is configured so that, when a predetermined warning condition of the working machine occurs, a piece of warning information corresponding to the occurring warning condition is indicated in a second display region which is smaller than the first display region, and
wherein the display control unit is configured so that, when a plurality of warning conditions occurs, a piece of warning information corresponding to one of the warning conditions is indicated in the second display region, and the number of the pieces of warning information corresponding to the occurring warning conditions is indicated on the display screen.

16. The display controller according to claim 8,
wherein the display controller is configured to indicate, on the display, maximum flow rate levels of hydraulic fluid supplied or discharged to or from an actuator for driving an attachment,
wherein the display controller comprises a storage unit storing plural kinds of attachments capable of being attached to the working machine and settings of the maximum flow rate levels corresponding to the respective kinds of attachments, and
wherein the display control unit is configured to indicate, on the display, a list of the settings of the maximum flow rate levels corresponding to the respective kinds of attachments.

17. The display controller according to claim 8,
wherein the display controller is configured to display, on the display, flow rate setting images for variable setting of maximum flow rate levels of hydraulic fluid supplied or discharged to or from an actuator for driving an attachment attached to the working machine including operation members each operable in operation directions,
wherein the display controller comprises a storage unit that stores plural kinds of attachments capable of being attached to the working machine, at least one of the operation members required to operate each of the stored kinds of attachments, and at least one of the operation directions for operation of the required at least one operation member to operate each of the stored kinds of attachments,
wherein the display control unit is configured to display, on the display, when an operation to set the maximum flow rate levels of hydraulic fluid corresponding to one attachment selected from the stored kinds of attachments is performed, flow rate setting images which correspond to the respective operation members and correspond to the respective operation directions of each of the operation members,
wherein any of the flow rate setting images, which corresponds to the at least one operation member required to operate the selected kind of attachment and corresponds to the at least one operation direction of the required at least one operation member required to operate the selected kind of attachment, is displayed as being in an active state indicating that the variable setting of the corresponding maximum flow rate level is acceptable, and
wherein any of the flow rate setting images, which corresponds to the at least one operation member unrequired to operate the selected kind of attachment or corresponds to the at least one operation direction unrequired to operate the selected kind of attachment, is displayed as being in an inactive state indicating that the variable setting of the corresponding maximum flow rate level is inacceptable, or is not displayed.

18. A working machine comprising:
the display controller according to claim 8; and
a display displaying content that is controlled by the display controller.

19. A computer readable storage medium, which stores a program to be executed by a computer for a processing by means of the display control unit in the display controller according to claim 8.

* * * * *